United States Patent
Arndt et al.

(10) Patent No.: US 7,653,801 B2
(45) Date of Patent: Jan. 26, 2010

(54) SYSTEM AND METHOD FOR MANAGING METRICS TABLE PER VIRTUAL PORT IN A LOGICALLY PARTITIONED DATA PROCESSING SYSTEM

(75) Inventors: Richard Louis Arndt, Austin, TX (US); Harvey Gene Kiel, Rochester, MN (US); Renato John Recio, Austin, TX (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/349,971

(22) Filed: Jan. 7, 2009

(65) Prior Publication Data

US 2009/0106475 A1    Apr. 23, 2009

Related U.S. Application Data

(63) Continuation of application No. 11/943,441, filed on Nov. 20, 2007, now Pat. No. 7,487,326.

(51) Int. Cl.
| | |
|---|---|
| *G06F 12/00* | (2006.01) |
| *G06F 130/00* | (2006.01) |
| *G06F 13/28* | (2006.01) |
| *G06F 9/455* | (2006.01) |
| *G06F 13/14* | (2006.01) |
| *G06F 13/36* | (2006.01) |
| *G06F 3/00* | (2006.01) |
| *G06F 9/44* | (2006.01) |
| *G06F 9/46* | (2006.01) |

(52) U.S. Cl. .................. 711/173; 703/25; 710/305; 710/306; 719/324

(58) Field of Classification Search .................. None
See application file for complete search history.

(56) References Cited

U.S. PATENT DOCUMENTS 6,111,894 A    8/2000    Bender et al.

(Continued)

FOREIGN PATENT DOCUMENTS

EP    1508855 A2    2/2005

OTHER PUBLICATIONS

Jann et al., "Dynamic Reconfiguration: Basic Building Blocks for Autonomic Computing on IBM PSeries Servers," IBM System Journal, vol. 42, Jan. 2003 pp. 29-37.

(Continued)

*Primary Examiner*—Matt Kim
*Assistant Examiner*—Michael Alsip
(74) *Attorney, Agent, or Firm*—Yee & Associates, P.C.; Diana R. Gerhardt

(57) ABSTRACT

A method, computer program product, and distributed data processing system that allows a single physical I/O adapter, such as a PCI, PCI-X, or PCI-E adapter, to track performance and reliability statistics per virtual upstream and downstream port, thereby allowing a system and network management to be performed at finer granularity than what is possible using conventional physical port statistics, is provided. Particularly, a mechanism of managing per-virtual port performance metrics in a logically partitioned data processing system including allocating a subset of resources of a physical adapter to a virtual adapter of a plurality of virtual adapters is provided. The subset of resources includes a virtual port having an identifier assigned thereto. The identifier of the virtual port is associated with an address of a physical port. A metric table is associated with the virtual port, wherein the metric table includes metrics of operations that target the virtual port.

13 Claims, 15 Drawing Sheets

U.S. PATENT DOCUMENTS

| | | | |
|---|---|---|---|
| 6,134,641 | A | 10/2000 | Anand |
| 6,629,157 | B1* | 9/2003 | Falardeau et al. ............. 710/10 |
| 6,629,162 | B1* | 9/2003 | Arndt et al. ................... 710/28 |
| 6,662,289 | B1 | 12/2003 | Ang |
| 6,665,759 | B2 | 12/2003 | Dawkins et al. |
| 6,704,284 | B1* | 3/2004 | Stevenson et al. ........... 370/241 |
| 6,804,741 | B2 | 10/2004 | Cowan |
| 6,823,418 | B2* | 11/2004 | Langendorf et al. ......... 710/306 |
| 6,880,021 | B2 | 4/2005 | Easton et al. |
| 6,973,510 | B2 | 12/2005 | Arndt et al. |
| 7,080,291 | B2 | 7/2006 | Moriki et al. |
| 2002/0069335 | A1 | 6/2002 | Flylnn, Jr. |
| 2002/0085493 | A1 | 7/2002 | Pekkala et al. |
| 2002/0112102 | A1 | 8/2002 | Tarui et al. |
| 2002/0129172 | A1 | 9/2002 | Baskey et al. |
| 2002/0129212 | A1 | 9/2002 | Lee et al. |
| 2003/0014738 | A1 | 1/2003 | Dawkins et al. |
| 2003/0061379 | A1* | 3/2003 | Craddock et al. ........... 709/238 |
| 2003/0110205 | A1 | 6/2003 | Johnson |
| 2003/0204648 | A1 | 10/2003 | Arndt |
| 2003/0236852 | A1 | 12/2003 | Fernandes et al. |
| 2004/0202189 | A1 | 10/2004 | Arndt et al. |
| 2005/0076157 | A1 | 4/2005 | Serizawa et al. |
| 2005/0091365 | A1 | 4/2005 | Lowell et al. |
| 2005/0097384 | A1 | 5/2005 | Uehara et al. |
| 2005/0102682 | A1 | 5/2005 | Shah et al. |
| 2005/0119996 | A1* | 6/2005 | Ohata et al. .................... 707/3 |
| 2005/0120160 | A1 | 6/2005 | Plouffe et al. |
| 2005/0182788 | A1 | 8/2005 | Arndt et al. |
| 2005/0240932 | A1 | 10/2005 | Billau et al. |
| 2005/0246450 | A1* | 11/2005 | Enko et al. .................. 709/230 |
| 2006/0044301 | A1 | 3/2006 | Ha |
| 2006/0069828 | A1 | 3/2006 | Goldsmith |
| 2006/0112376 | A1 | 5/2006 | Broberg et al. |
| 2006/0184349 | A1 | 8/2006 | Goud et al. |
| 2006/0193327 | A1 | 8/2006 | Arndt et al. |
| 2006/0195617 | A1 | 8/2006 | Arndt et al. |
| 2006/0195618 | A1 | 8/2006 | Arndt et al. |
| 2006/0195619 | A1 | 8/2006 | Arndt et al. |
| 2006/0195620 | A1 | 8/2006 | Arndt et al. |
| 2006/0195623 | A1 | 8/2006 | Arndt et al. |
| 2006/0195626 | A1 | 8/2006 | Arndt et al. |
| 2006/0195634 | A1 | 8/2006 | Arndt et al. |
| 2006/0195642 | A1 | 8/2006 | Arndt et al. |
| 2006/0195644 | A1 | 8/2006 | Arndt et al. |
| 2006/0195663 | A1 | 8/2006 | Arndt et al. |
| 2006/0195673 | A1 | 8/2006 | Arndt et al. |
| 2006/0195675 | A1 | 8/2006 | Arndt et al. |
| 2006/0195848 | A1 | 8/2006 | Arndt et al. |
| 2006/0209724 | A1 | 9/2006 | Arndt et al. |
| 2006/0209863 | A1 | 9/2006 | Arndt et al. |
| 2006/0212606 | A1 | 9/2006 | Arndt et al. |
| 2006/0212608 | A1 | 9/2006 | Arndt et al. |
| 2006/0212620 | A1 | 9/2006 | Arndt et al. |
| 2006/0212870 | A1 | 9/2006 | Arndt et al. |
| 2006/0224790 | A1 | 10/2006 | Arndt et al. |
| 2006/0239287 | A1 | 10/2006 | Johnsen et al. |
| 2006/0242330 | A1 | 10/2006 | Torudbakken et al. |
| 2006/0242332 | A1 | 10/2006 | Johnsen et al. |
| 2006/0242333 | A1 | 10/2006 | Johnsen et al. |
| 2006/0242352 | A1 | 10/2006 | Torudbakken et al. |
| 2006/0242354 | A1 | 10/2006 | Johnsen et al. |
| 2006/0253619 | A1 | 11/2006 | Torudbakken et al. |

OTHER PUBLICATIONS

"Logical Partition Security in the IBM @server pSeries 690", IBM, 2002, pp. 1-13.

Hensbergen, "The Effect of Virtualization on OS Interference", IBM Research, Proceedings of 1st workshop on Operating Systems Inteference in High Performance Applications, Aug. 2005, p. 1-6.

"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

* cited by examiner

SYSTEM AND METHOD FOR MANAGING METRICS TABLE PER VIRTUAL PORT IN A LOGICALLY PARTITIONED DATA PROCESSING SYSTEM

This application is a continuation of application Ser. No. 11/943,441, filed Nov. 20, 2007, status allowed, which is a continuation application of U.S. Pat. No. 7,308,551, filed Feb. 25, 2005.

CROSS-REFERENCE TO RELATED APPLICATIONS

This application is related to commonly assigned and co-pending U.S. patent application Ser. No. 11/066,424 entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645 entitled "Virtualized I/O Adapter for a Multi-Processor Data Processing System"; U.S. patent application Ser. No. 11/065,869 entitled "Virtualized Fibre Channel Adapter for a Multi-Processor Data Processing System"; U.S. patent application Ser. No. 11/065,951 entitled "Interrupt Mechanism on an IO Adapter That Supports Virtualization"; U.S. patent application Ser. No. 11/066,201 entitled "System and Method for Modification of Virtual Adapter Resources in a Logically Partitioned Data Processing System"; U.S. patent application Ser. No. 11/065,818 entitled "Method, System, and Computer Program Product for Virtual Adapter Destruction on a Physical Adapter that Supports Virtual Adapters"; U.S. patent application Ser. No. 11/066,518 entitled "System and Method of Virtual Resource Modification on a Physical Adapter that Supports Virtual Resources"; U.S. patent application Ser. No. 11/066,096 entitled "System and Method for Destroying Virtual Resources in a Logically Partitioned Data Processing System"; U.S. patent application Ser. No. 11/066,419 entitled "Association of Memory Access Through Protection Attributes that are Associated to an Access Control Level on a PCI Adapter that Supports Virtualization"; U.S. patent application Ser. No. 11/066,931 entitled "Association of Host Translations that are Associated to an Access Control Level on a PCI Bridge that Supports Virtualization"; U.S. patent application Ser. No. 11/065,823 entitled "Method, Apparatus, and Computer Program Product for Coordinating Error Reporting and Reset Utilizing an I/O Adapter that Supports Virtualization"; U.S. patent application Ser. No. 11/068,664 entitled "Method and System for Fully Trusted Adapter Validation of Addresses Referenced in a Virtual Host Transfer Request"; U.S. patent application Ser. No. 11/066,353 entitled "System, Method, and Computer Program Product for a Fully Trusted Adapter Validation of Incoming Memory Mapped I/O Operations on a Physical Adapter that Supports Virtual Adapters or Virtual Resources"; U.S. patent application Ser. No. 11/065,830 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization"; U.S. patent application Ser. No. 11/066,517 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification"; U.S. patent application Ser. No. 11/066,487 entitled "Native Virtualization on a Partially Trusted Adapter Using PCI Host Memory Mapped Input/Output Memory Address for Identification"; U.S. patent application Ser. No. 11/066,519 entitled "Native Virtualization on a Partially Trusted Adapter Using PCI Host Bus, Device, and Function Number for Identification"; U.S. patent application Ser. No. 11/066,521 entitled "System and Method for Virtual Adapter Resource Allocation"; and U.S. patent application Ser. No. 11/0667,354 entitled "System and Method for Providing Quality of Service in a Virtual Adapter" all of which are hereby incorporated by reference.

BACKGROUND OF THE INVENTION

1. Technical Field

The present invention relates generally to communication protocols between a host computer and an input/output (I/O) adapter. More specifically, the present invention provides an implementation for virtualizing resources on a physical I/O. In particular, the present inventions provides a mechanism by which a single physical I/O adapter, such as a PCI, PCI-X, or PCI-E adapter, can track performance and reliability statistics per virtual upstream and downstream port, thereby allowing a system and network management to be performed at finer granularity than what is possible in conventional implementations using physical port statistics.

2. Description of Related Art

Virtualization is the creation of substitutes for real resources. The substitutes have the same functions and external interfaces as their real counterparts, but differ in attributes such as size, performance, and cost. These substitutes are virtual resources and their users are usually unaware of the substitute's existence. Servers have used two basic approaches to virtualize system resources: partitioning and logical partitioning (LPAR) managers. Partitioning creates virtual servers as fractions of a physical server's resources, typically in coarse (e.g. physical) allocation units (e.g. a whole processor, along with its associated memory and I/O adapters). LPAR managers are software or firmware components that can virtualize all server resources with fine granularity (e.g. in small fractions that of a single physical resource).

In conventional systems, servers that support virtualization have two general options for handling I/O. The first option was to not allow a single physical I/O adapter to be shared between virtual servers. The second option was to add functionality into the LPAR manager, or another suitable intermediary, that provides the isolation necessary to permit multiple operating systems to share a single physical adapter.

The first option has several problems. One significant problem is that expensive adapters cannot be shared between virtual servers. If a virtual server only needs to use a fraction of an expensive adapter, an entire adapter would be dedicated to the server. As the number of virtual servers on the physical server increases, this leads to underutilization of the adapters and more importantly a more expensive solution, because each virtual server needs a physical adapter dedicated to it. For physical servers that support many virtual servers, another significant problem with this approach is that it requires many adapter slots, and the accompanying hardware (e.g. chips, connectors, cables, and the like) required to attach those adapters to the physical server.

Though the second option provides a mechanism for sharing adapters between virtual servers, that mechanism must be invoked and executed on every I/O transaction. The invocation and execution of the sharing mechanism by the LPAR manager or other intermediary on every I/O transaction degrades performance. It also leads to a more expensive solution, because the customer must purchase more hardware, either to make up for the cycles used to perform the sharing mechanism or, if the sharing mechanism is offloaded to an intermediary, for the intermediary hardware.

It would be advantageous to have an improved method, apparatus, and computer instructions that allow a single physical I/O adapter, such as a PCI, PCI-X, or PCI-E adapter, to track performance and reliability statistics per virtual upstream and downstream port, thereby allowing a system and network management to be performed at finer granularity than what is possible using conventional physical port statistics. It would also be advantageous to have the mechanism apply for adapters that support memory mapped I/O interfaces, such as Ethernet NICs (Network Interface Controllers), FC (Fibre Channel) HBAs (Host Bus Adapters), pSCSI (parallel SCSI) HBAs, InfiniBand, TCP/IP Offload Engines, RDMA (Remote Direct Memory Access) enabled NICs (Network Interface Controllers), iSCSI adapters, iSER (iSCSI Extensions for RDMA) adapters, and the like.

SUMMARY OF THE INVENTION

The present invention provides a method, computer program product, and distributed data processing system that allows a single physical I/O adapter, such as a PCI, PCI-X, or PCI-E adapter, to track performance and reliability statistics per virtual upstream and downstream port, thereby allowing a system and network management to be performed at finer granularity than what is possible using conventional physical port statistics. Specifically, the present invention is directed to a mechanism for sharing PCI (Peripheral Component Interconnect) I/O adapters, PCI-X I/O Adapters, PCI-Express I/O Adapters, and, in general, any I/O adapter that uses a memory mapped I/O interface for communications. A mechanism is provided that allows a single physical I/O adapter, such as a PCI, PCI-X, or PCI-E adapter, to track performance and reliability statistics per virtual upstream and downstream port, thereby allowing a system and network management to be performed at finer granularity than what is possible using conventional physical port statistics. Particularly, a mechanism of managing per-virtual port performance metrics in a logically partitioned data processing system including allocating a subset of resources of a physical adapter to a virtual adapter of a plurality of virtual adapters is provided. The subset of resources includes a virtual port having an identifier assigned thereto. The identifier of the virtual port is associated with an address of a physical port. A metric table is associated with the virtual port, wherein the metric table includes metrics of operations that target the virtual port.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating the key elements of the parallel Peripheral Computer Interface (PCI) bus protocol in accordance with a preferred embodiment of the present invention;

DETAILED DESCRIPTION OF THE PREFERRED EMBODIMENT

The present invention applies to any general or special purpose host that uses a PCI family I/O adapter to directly attach a storage device or to attach to a network, where the network consists of endnodes, switches, routers and the links interconnecting these components. The network links can be, for example, Fibre Channel, Ethernet, InfiniBand, Advanced Switching Interconnect, or a proprietary link that uses proprietary or standard protocols. While embodiments of the present invention are shown and described as employing a peripheral component interconnect (PCI) family adapter, implementations of the invention are not limited to such a configuration as will be apparent to those skilled in the art. Teachings of the invention may be implemented on any physical adapter that support a memory mapped input/output (MMIO) interface, such as, but not limited to, HyperTransport, Rapid I/O, proprietary MMIO interfaces, or other adapters having a MMIO interface now know or later developed. Implementations of the present invention utilizing a PCI family adapter are provided for illustrative purposes to facilitate an understanding of the invention.

Figure 1:
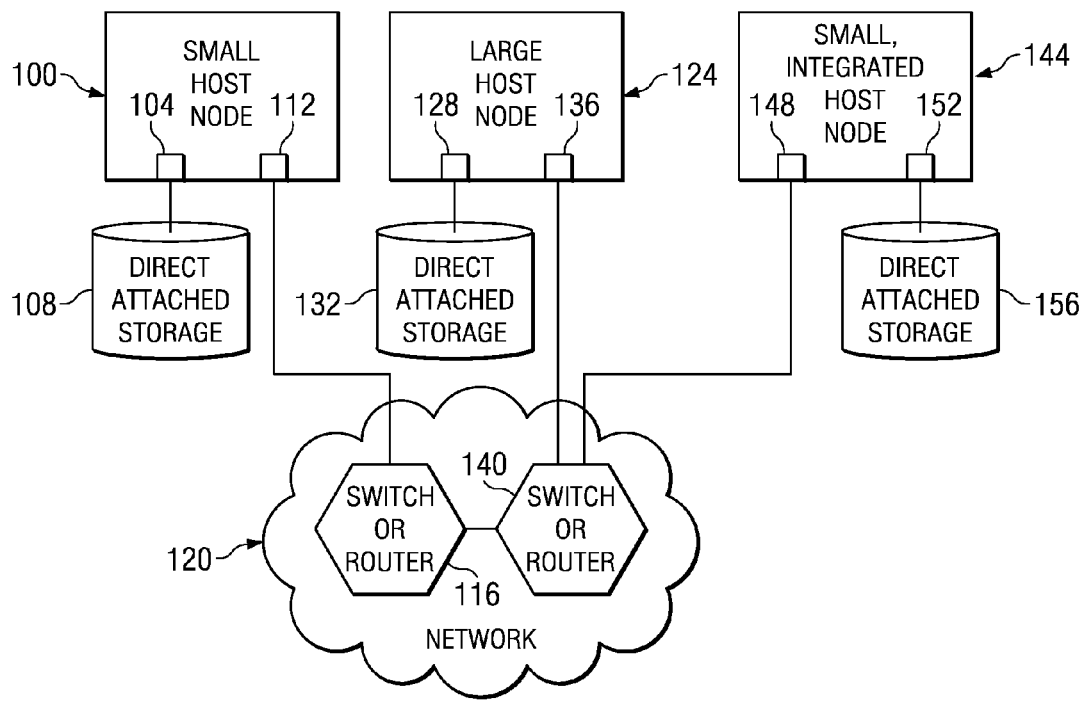
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a network, such as network 120, and is provided merely for illustrative purposes and the embodiments of the present invention described below can be implemented on computer systems of numerous other types and configurations. Two switches (or routers) are shown inside of network 120—switch 116 and switch 140. Switch 116 connects to small host node 100 through port 112. Small host node 100 also contains a second type of port 104 which connects to a direct attached storage subsystem, such as direct attached storage 108.

Network 120 can also attach large host node 124 through port 136 which attaches to switch 140. Large host node 124 can also contain a second type of port 128, which connects to a direct attached storage subsystem, such as direct attached storage 132.

Network 120 can also attach a small integrated host node 144 which is connected to network 120 through port 148 which attaches to switch 140. Small integrated host node 144 can also contain a second type of port 152 which connects to a direct attached storage subsystem, such as direct attached storage 156.

Figure 2:
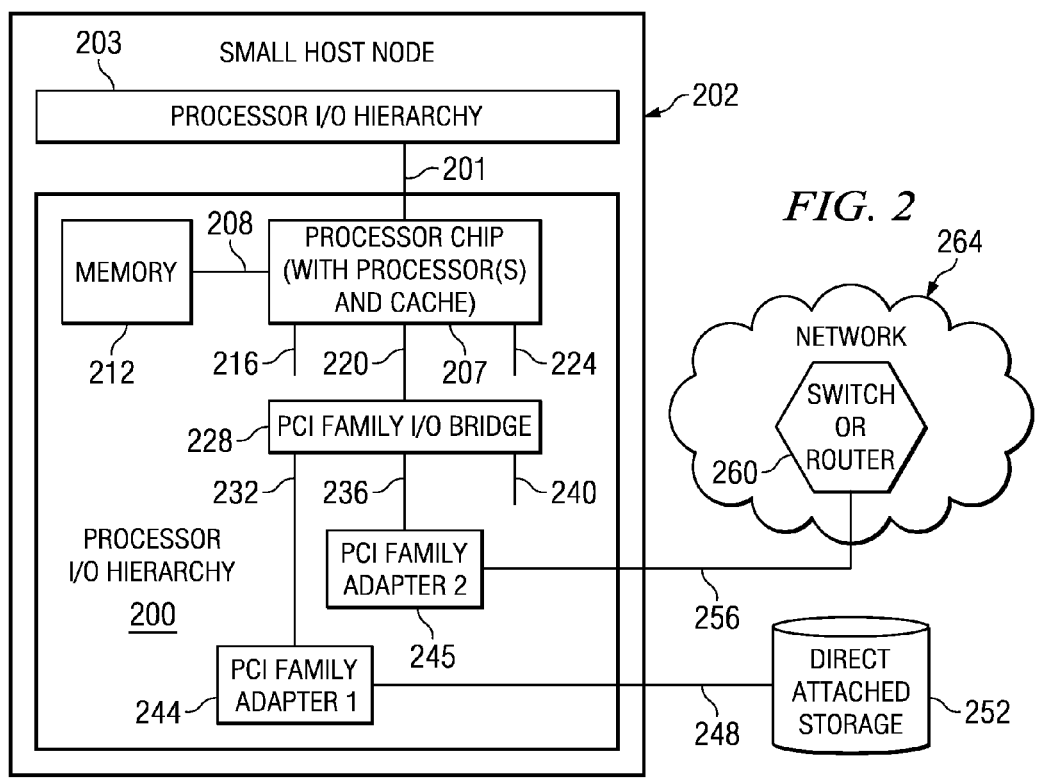
FIG. 2 is a functional block diagram of a small host processor node in accordance with a preferred embodiment of the present invention.

Turning next to FIG. 2, a functional block diagram of a small host node is depicted in accordance with a preferred embodiment of the present invention. Small host node 202 is an example of a host processor node, such as small host node 100 shown in FIG. 1.

In this example, small host node 202 includes two processor I/O hierarchies, such as processor I/O hierarchies 200 and 203, which are interconnected through link 201. In the illustrative example of FIG. 2, processor I/O hierarchy 200 includes processor chip 207 which includes one or more processors and their associated caches. Processor chip 207 is connected to memory 212, which is an example of a computer readable medium and is a statutory storage device, through link 208. One of the links on processor chip, such as link 220, connects to PCI family I/O bridge 228. PCI family I/O bridge 228 has one or more PCI family (e.g., PCI, PCI-X, PCI-Express, or any future generation of PCI) links that is used to connect other PCI family I/O bridges or a PCI family I/O adapter, such as PCI family adapter 244 and PCI family adapter 245, through a PCI link, such as links 232, 236, and 240. PCI family adapter 245 can also be used to connect a network, such as network 264, through a link via either a switch or router, such as switch or router 260. PCI family adapter 244 can be used to connect direct attached storage, such as direct attached storage 252, through link 248. Processor I/O hierarchy 203 may be configured in a manner similar to that shown and described with reference to processor I/O hierarchy 200.

Figure 3:
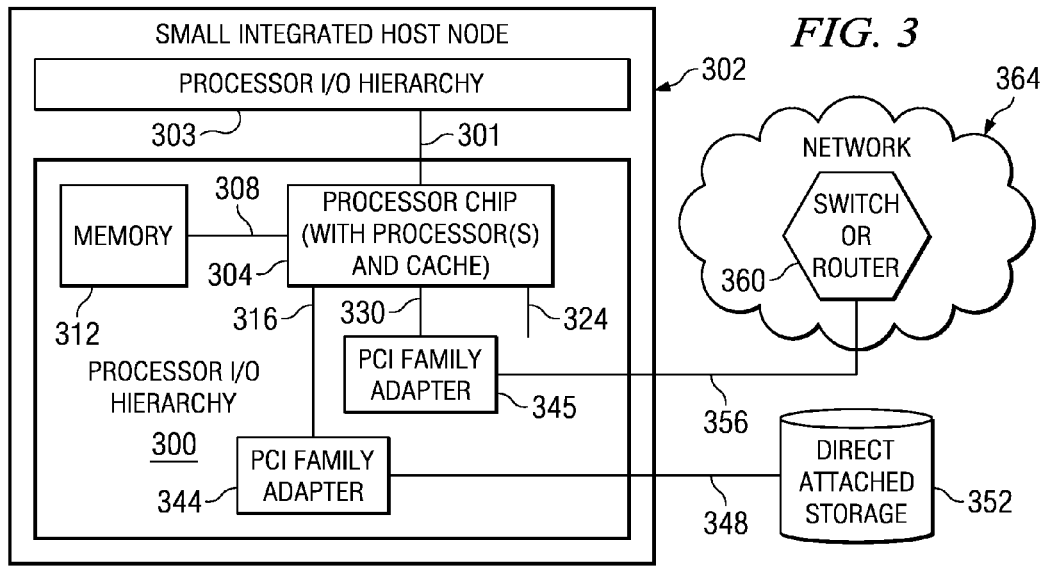
FIG. 3 is a functional block diagram of a small, integrated host processor node in accordance with a preferred embodiment of the present invention.

With reference now to FIG. 3, a functional block diagram of a small integrated host node is depicted in accordance with a preferred embodiment of the present invention. Small integrated host node 302 is an example of a host processor node, such as small integrated host node 144 shown in FIG. 1.

In this example, small integrated host node 302 includes two processor I/O hierarchies 300 and 303, which are interconnected through link 301. In the illustrative example, processor I/O hierarchy 300 includes processor chip 304, which is representative of one or more processors and associated caches. Processor chip 304 is connected to memory 312 through link 308. One of the links on the processor chip, such as link 330, connects to a PCI family adapter, such as PCI family adapter 345. Processor chip 304 has one or more PCI family (e.g., PCI, PCI-X, PCI-Express, or any future generation of PCI) links that is used to connect either PCI family I/O bridges or a PCI family I/O adapter, such as PCI family adapter 344 and PCI family adapter 345 through a PCI link, such as links 316, 330, and 324. PCI family adapter 345 can also be used to connect with a network, such as network 364, through link 356 via either a switch or router, such as switch or router 360. PCI family adapter 344 can be used to connect with direct attached storage 352 through link 348.

Figure 4:
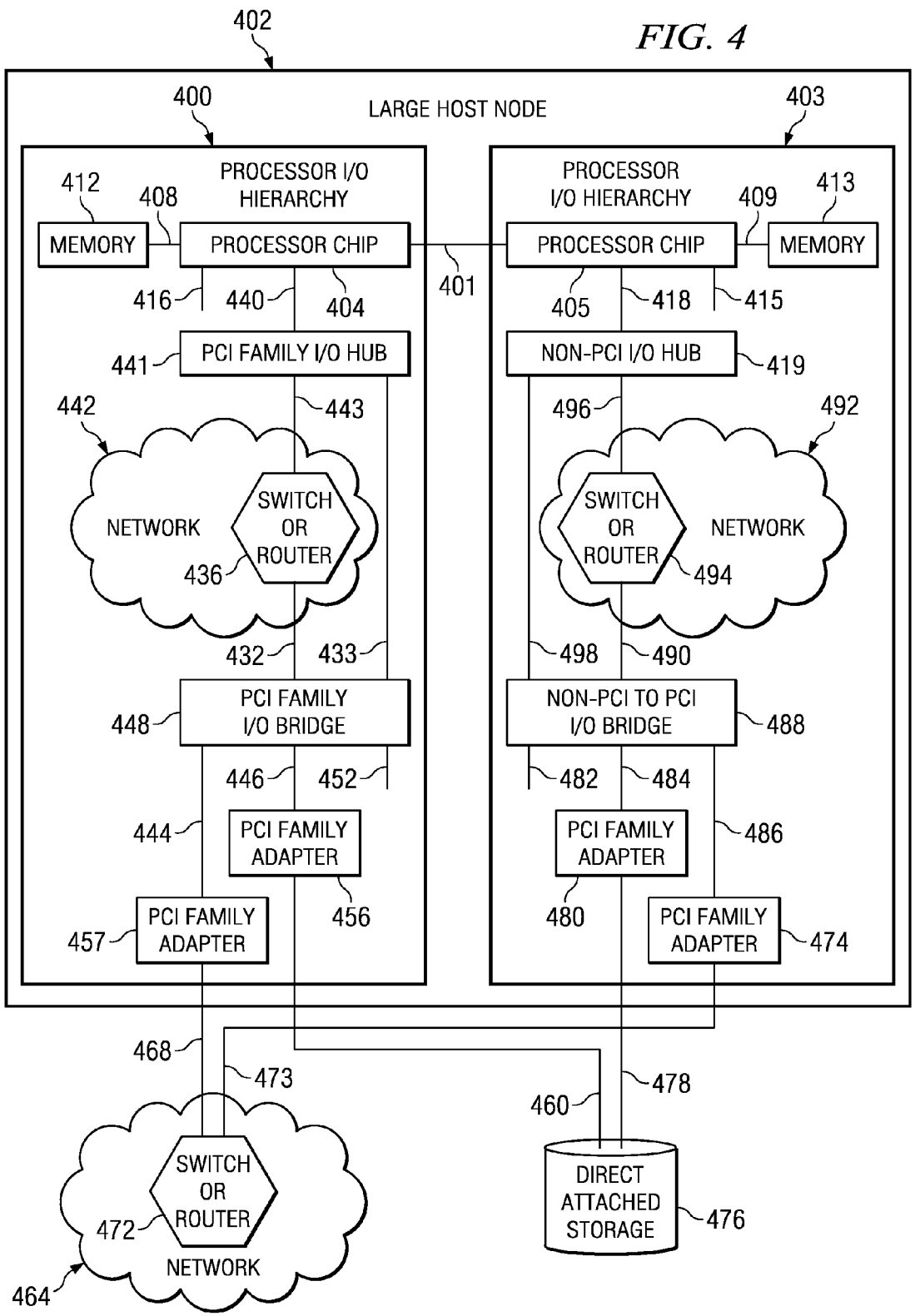
FIG. 4 is a functional block diagram of a large host processor node in accordance with a preferred embodiment of the present invention.

Turning now to FIG. 4, a functional block diagram of a large host node is depicted in accordance with a preferred embodiment of the present invention. Large host node 402 is an example of a host processor node, such as large host node 124 shown in FIG. 1.

In this example, large host node 402 includes two processor I/O hierarchies 400 and 403 interconnected through link 401. In the illustrative example of FIG. 4, processor I/O hierarchy 400 includes processor chip 404, which is representative of one or more processors and associated caches. Processor chip 404 is connected to memory 412 through link 408. One of the links, such as link 440, on the processor chip connects to a PCI family I/O hub, such as PCI family I/O hub 441. The PCI family I/O hub uses a network 442 to attach to a PCI family I/O bridge 448. That is, PCI family I/O bridge 448 is connected to switch or router 436 through link 432 and switch or router 436 also attaches to PCI family I/O hub 441 through link 443. Network 442 allows the PCI family I/O hub and PCI family I/O bridge to be placed in different packages. PCI family I/O bridge 448 has one or more PCI family (e.g., PCI, PCI-X, PCI-Express, or any future generation of PCI) links that is used to connect with other PCI family I/O bridges or a PCI family I/O adapter, such as PCI family adapter 456 and PCI family adapter 457 through a PCI link, such as links 444, 446, and 452. PCI family adapter 456 can be used to connect direct attached storage 476 through link 460. PCI family adapter 457 can also be used to connect with network 464 through link 468 via, for example, either a switch or router 472.

Turning next to FIG. 5, illustrations of the phases contained in a PCI bus transaction 500 and a PCI-X bus transaction 520 are depicted in accordance with a preferred embodiment of the present invention. PCI bus transaction 500 depicts a conventional PCI bus transaction that forms the unit of information which is transferred through a PCI fabric for conventional PCI. PCI-X bus transaction 520 depicts the PCI-X bus transaction that forms the unit of information which is transferred through a PCI fabric for PCI-X.

PCI bus transaction 500 shows three phases: an address phase 508; a data phase 512; and a turnaround cycle 516. Also depicted is the arbitration for next transfer 504, which can occur simultaneously with the address, data, and turnaround cycle phases. For PCI, the address contained in the address phase is used to route a bus transaction from the adapter to the host and from the host to the adapter.

PCI-X transaction 520 shows five phases: an address phase 528; an attribute phase 532; a response phase 560; a data phase 564; and a turnaround cycle 566. Also depicted is the arbitration for next transfer 524 which can occur simultaneously with the address, attribute, response, data, and turnaround cycle phases. Similar to conventional PCI, PCI-X uses the address contained in the address phase to route a bus transaction from the adapter to the host and from the host to the adapter. However, PCI-X adds the attribute phase 532 which contains three fields that define the bus transaction requester, namely: requester bus number 544, requester device number 548, and requestor function number 552 (collectively referred to herein as a BDF). The bus transaction also contains a tag 540 that uniquely identifies the specific bus transaction in relation to other bus transactions that are outstanding between the requester and a responder. The byte count 556 contains a count of the number of bytes being sent.

Figure 6:
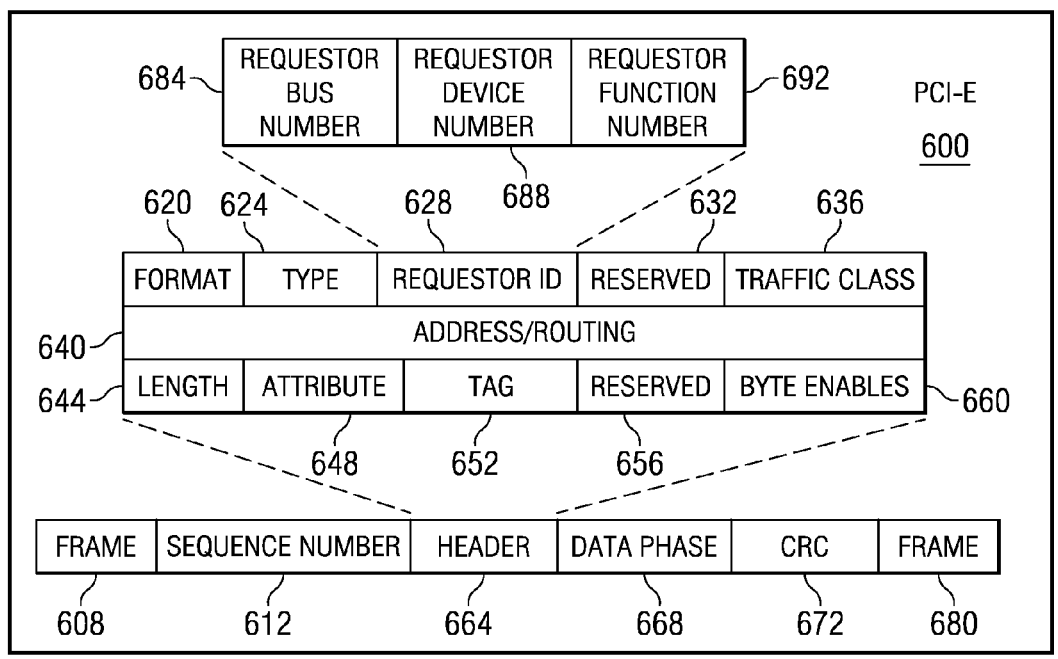
FIG. 6 is a diagram illustrating the key elements of the serial PCI bus protocol in accordance with a preferred embodiment of the present invention.

Turning now to FIG. 6, an illustration of the phases contained in a PCI-Express bus transaction is depicted in accordance with a preferred embodiment of the present invention. PCI-E bus transaction 600 forms the unit of information which is transferred through a PCI fabric for PCI-E.

PCI-E bus transaction 600 shows six phases: frame phase 608; sequence number 612; header 664; data phase 668; cyclical redundancy check (CRC) 672; and frame phase 680. PCI-E header 664 contains a set of fields defined in the PCI-Express specification. The requestor identifier (ID) field 628 contains three fields that define the bus transaction requester, namely: requester bus number 684, requester device number 688, and requestor function number 692. The PCI-E header also contains tag 652, which uniquely identifies the specific bus transaction in relation to other bus transactions that are outstanding between the requester and a responder. The length field 644 contains a count of the number of bytes being sent.

Figure 7:
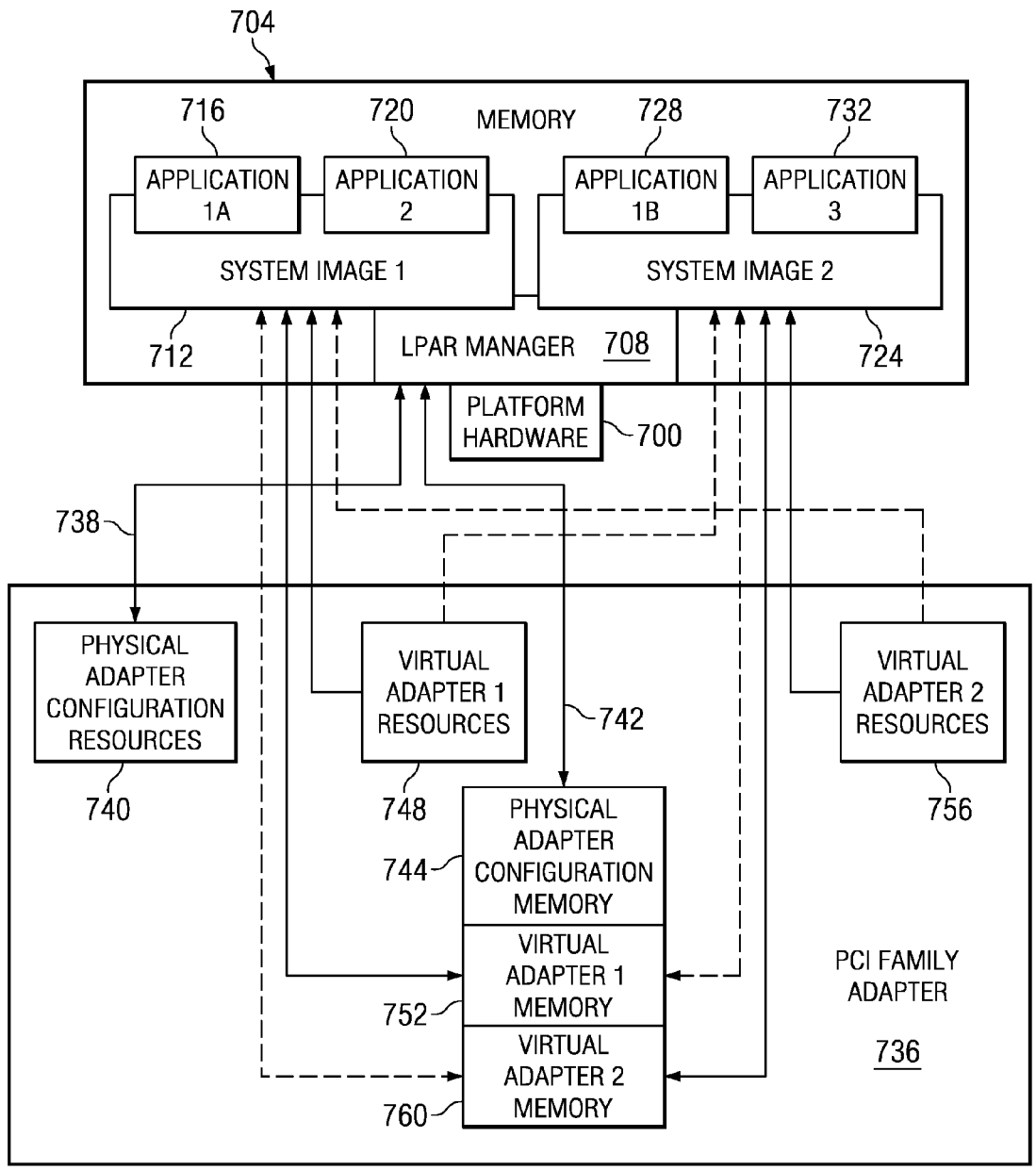
FIG. 7 is a diagram illustrating the I/O virtualization functions provided in a host processor node in order to provide virtual host access isolation in accordance with a preferred embodiment of the present invention.

With reference now to FIG. 7, a functional block diagram of a PCI adapter, such as PCI family adapter 736, and the firmware and software that run on host hardware (e.g. processor with possibly an I/O hub or I/O bridge), such as host hardware 700, is depicted in accordance with a preferred embodiment of the present invention.

FIG. 7 also shows a logical partitioning (LPAR) manager 708 running on host hardware 700. LPAR manager 708 may be implemented as a Hypervisor manufactured by International Business Machines, Inc. of Armonk, N.Y. LPAR manager 708 can run in firmware, software, or a combination of the two. LPAR manager 708 hosts two system image (SI) partitions, such as system image 712 and system image 724 (illustratively designated system image 1 and system image 2, respectively). The system image partitions may be respective operating systems running in software, a special purpose image running in software, such as a storage block server or storage file server image, or a special purpose image running in firmware. Applications can run on these system images, such as applications 716, 720, 728, and 732 (illustratively designated application 1A, application 2, application 1B and application 3). Applications 716 and 728 are representative of separate instances of a common application program, and are thus illustratively designated with respective references of "1A" and "1B". In the illustrative example, applications 716 and 720 run on system image 712 and applications 728 and 732 run on system image 724. As referred to herein, a virtual host comprises a system image, such as system image 712, or the combination of a system image and applications running within the system image. Thus, two virtual hosts are depicted in FIG. 7.

PCI family adapter 736 contains a set of physical adapter configuration resources 740 and physical adapter memory resources 744. The physical adapter configuration resources 740 and physical adapter memory resources 744 contain information describing the number of virtual adapters that PCI family adapter 736 can support and the physical resources allocated to each virtual adapter. As referred to herein, a virtual adapter is an allocation of a subset of physical adapter resources and virtualized resources, such as a subset of physical adapter resources and physical adapter memory, that is associated with a logical partition, such as system image 712 and applications 716 and 720 running on system image 712, as described more fully hereinbelow. LPAR manager 708 is provided a physical configuration resource interface 738, and physical memory configuration interface 742 to read and write into the physical adapter configuration resource and memory spaces during the adapter's initial configuration and reconfiguration. Through the physical configuration resource interface 738 and physical configuration memory interface 742, LPAR manager 708 creates virtual adapters and assigns physical resources to each virtual adapter. LPAR manager 708 may use one of the system images, for example a special software or firmware partition, as a hosting partition that uses physical configuration resource interface 738 and physical configuration memory interface 742 to perform a portion, or even all, of the virtual adapter initial configuration and reconfiguration functions.

FIG. 7 shows a configuration of PCI family adapter 736 configured with two virtual adapters. A first virtual adapter (designated virtual adapter 1) comprises virtual adapter resources 748 and virtual adapter memory 752 that were assigned by LPAR manager 708 and that is associated with system image 712 (designated system image 1). Similarly, a second virtual adapter (designated virtual adapter 2) comprises virtual adapter resources 756 and virtual adapter memory 760 that were assigned by LPAR manager 708 to virtual adapter 2 and that is associated with another system image 724 (designated system image 2). For an adapter used to connect to a direct attached storage, such as direct attached storage 108, 132, or 156 shown in FIG. 1, examples of virtual adapter resources may include: the list of the associated physical disks, a list of the associated logical unit numbers, and a list of the associated adapter functions (e.g., redundant arrays of inexpensive disks (RAID) level). For an adapter used to connect to a network, such as network 120 of FIG. 1, examples of virtual adapter resources may include: a list of the associated link level identifiers, a list of the associated network level identifiers, a list of the associated virtual fabric identifiers (e.g. Virtual LAN IDs for Ethernet fabrics, N-port IDs for Fibre Channel fabrics, and partition keys for Infini-Band fabrics), and a list of the associated network layers functions (e.g. network offload services).

After LPAR manager 708 configures the PCI family adapter 736, each system image is allowed to only communicate with the virtual adapters that were associated with that system image by LPAR manager 708. As shown in FIG. 7 (by solid lines), system image 712 is allowed to directly communicate with virtual adapter resources 748 and virtual adapter memory 752 of virtual adapter 1. System image 712 is not allowed to directly communicate with virtual adapter resources 756 and virtual adapter memory 760 of virtual adapter 2 as shown in FIG. 7 by dashed lines. Similarly, system image 724 is allowed to directly communicate with virtual adapter resources 756 and virtual adapter memory 760 of virtual adapter 2, and is not allowed to directly communicate with virtual adapter resources 748 and virtual adapter memory 752 of virtual adapter 1.

Figure 8:
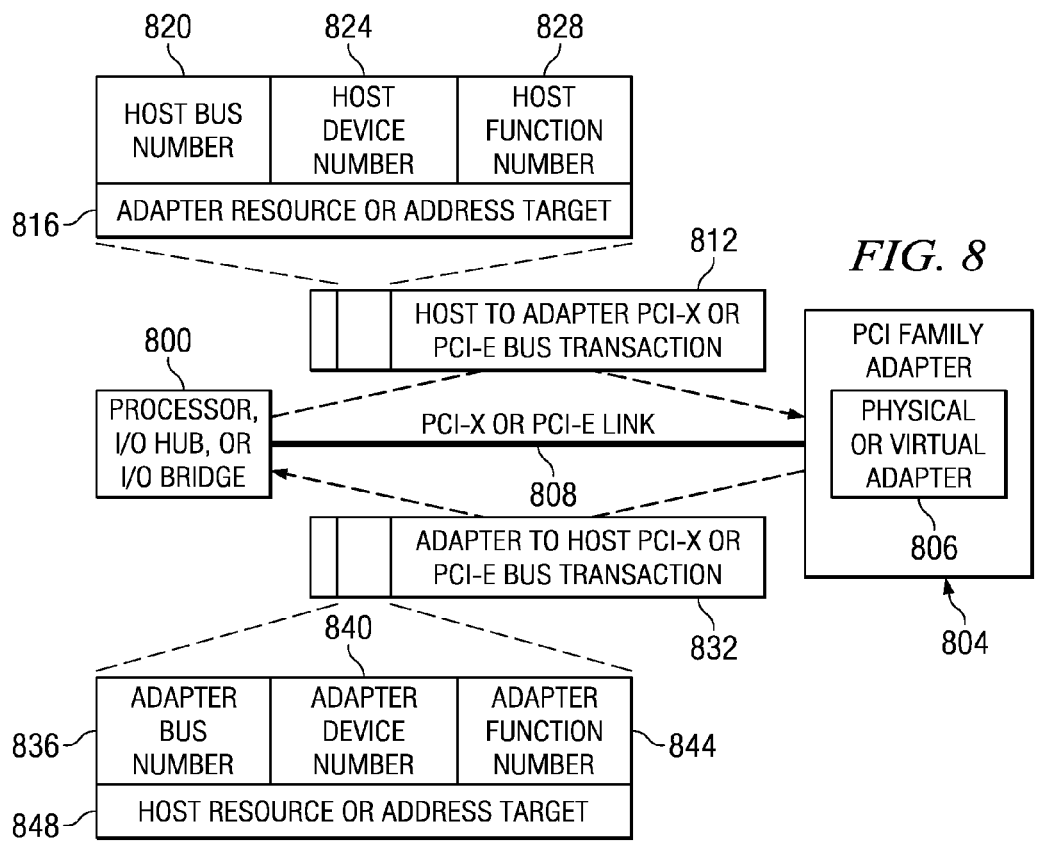
FIG. 8 is a diagram illustrating the control fields used in the PCI bus transaction to identify a virtual adapter or system image in accordance with a preferred embodiment of the present invention.

With reference now to FIG. 8, a depiction of a component, such as a processor, I/O hub, or I/O bridge 800, inside a host node, such as small host node 100, large host node 124, or small, integrated host node 144 shown in FIG. 1, that attaches a PCI family adapter, such as PCI family adapter 804, through a PCI-X or PCI-E link, such as PCI-X or PCI-E Link 808, in accordance with a preferred embodiment of the present invention is shown.

FIG. 8 shows that when a system image, such as system image 712 or 724, or LPAR manager 708 shown in FIG. 7 performs a PCI-X or PCI-E bus transaction, such as host to adapter PCI-X or PCI-E bus transaction 812, the processor, I/O hub, or I/O bridge 800 that connects to the PCI-X or PCI-E link 808 which issues the host to adapter PCI-X or PCI-E bus transaction 812 fills in the bus number, device number, and function number fields in the PCI-X or PCI-E bus transaction. The processor, I/O hub, or I/O bridge 800 has two options for how to fill in these three fields: it can either use the same bus number, device number, and function number for all software components that use the processor, I/O hub, or I/O bridge 800; or it can use a different bus number, device number, and function number for each software component that uses the processor, I/O hub, or I/O bridge 800. The originator or initiator of the transaction may be a software component, such as system image 712 or system image 724 (or an application running on a system image), or LPAR manager 708.

If the processor, I/O hub, or I/O bridge 800 uses the same bus number, device number, and function number for all transaction initiators, then when a software component initiates a PCI-X or PCI-E bus transaction, such as host to adapter PCI-X or PCI-E bus transaction 812, the processor, I/O hub, or I/O bridge 800 places the processor, I/O hub, or I/O bridge's bus number in the PCI-X or PCI-E bus transaction's requester bus number field 820, such as requester bus number 544 field of the PCI-X transaction shown in FIG. 5 or requester bus number 684 field of the PCI-E transaction shown in FIG. 6. Similarly, the processor, I/O hub, or I/O bridge 800 places the processor, I/O hub, or I/O bridge's device number in the PCI-X or PCI-E bus transaction's requester device number 824 field, such as requester device number 548 field shown in FIG. 5 or requester device number 688 field shown in FIG. 6. Finally, the processor, I/O hub, or I/O bridge 800 places the processor, I/O hub, or I/O bridge's function number in the PCI-X or PCI-E bus transaction's requester function number 828 field, such as requester function number 552 field shown in FIG. 5 or requestor function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address 816 field in FIG. 8.

If the processor, I/O hub, or I/O bridge 800 uses a different bus number, device number, and function number for each transaction initiator, then the processor, I/O hub, or I/O bridge 800 assigns a bus number, device number, and function number to the transaction initiator. When a software component initiates a PCI-X or PCI-E bus transaction, such as host to adapter PCI-X or PCI-E bus transaction 812, the processor, I/O hub, or I/O bridge 800 places the software component's bus number in the PCI-X or PCI-E bus transaction's requester bus number 820 field, such as requester bus number 544 field shown in FIG. 5 or requester bus number 684 field shown in FIG. 6. Similarly, the processor, I/O hub, or I/O bridge 800 places the software component's device number in the PCI-X or PCI-E bus transaction's requester device number 824 field, such as requester device number 548 field shown in FIG. 5 or requestor device number 688 field shown in FIG. 6. Finally, the processor, I/O hub, or I/O bridge 800 places the software component's function number in the PCI-X or PCI-E bus transaction's requestor function number 828 field, such as requester function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address field 816 in FIG. 8.

FIG. 8 also shows that when physical or virtual adapter 806 performs PCI-X or PCI-E bus transactions, such as adapter to host PCI-X or PCI-E bus transaction 832, the PCI family adapter, such as PCI physical family adapter 804, that connects to PCI-X or PCI-E link 808 which issues the adapter to host PCI-X or PCI-E bus transaction 832 places the bus number, device number, and function number associated with the physical or virtual adapter that initiated the bus transaction in the requestor bus number, device number, and function number 836, 840, and 844 fields. Notably, to support more than one bus or device number, PCI family adapter 804 must support one or more internal busses (For a PCI-X adapter, see the PCI-X Addendum to the PCI Local Bus Specification Revision 1.0 or 1.0a; for a PCI-E adapter see PCI-Express Base Specification Revision 1.0 or 1.0a the details of which are herein incorporated by reference). To perform this function, LPAR manager 708 associates each physical or virtual adapter to a software component running by assigning a bus number, device number, and function number to the physical or virtual adapter. When the physical or virtual adapter initiates an adapter to host PCI-X or PCI-E bus transaction, PCI family adapter 804 places the physical or virtual adapter's bus number in the PCI-X or PCI-E bus transaction's requestor bus number 836 field, such as requester bus number 544 field shown in FIG. 5 or requestor bus number 684 field shown in FIG. 6 (shown in FIG. 8 as adapter bus number 836). Similarly, PCI family adapter 804 places the physical or virtual adapter's device number in the PCI-X or PCI-E bus transaction's requester device number 840 field, such as Requestor device Number 548 field shown in FIG. 5 or requester device number 688 field shown in FIG. 6 (shown in FIG. 8 as adapter device number 840). PCI family adapter 804 places the physical or virtual adapter's function number in the PCI-X or PCI-E bus transaction's requestor function number 844 field, such as requester function number 552 field shown in FIG. 5 or requester function number 692 field shown in FIG. 6

(shown in FIG. 8 as adapter function number 844). Finally, PCI family adapter 804 also places in the PCI-X or PCI-E bus transaction the memory address of the software component that is associated, and targeted by, the physical or virtual adapter in host resource or address 848 field.

Figure 9:
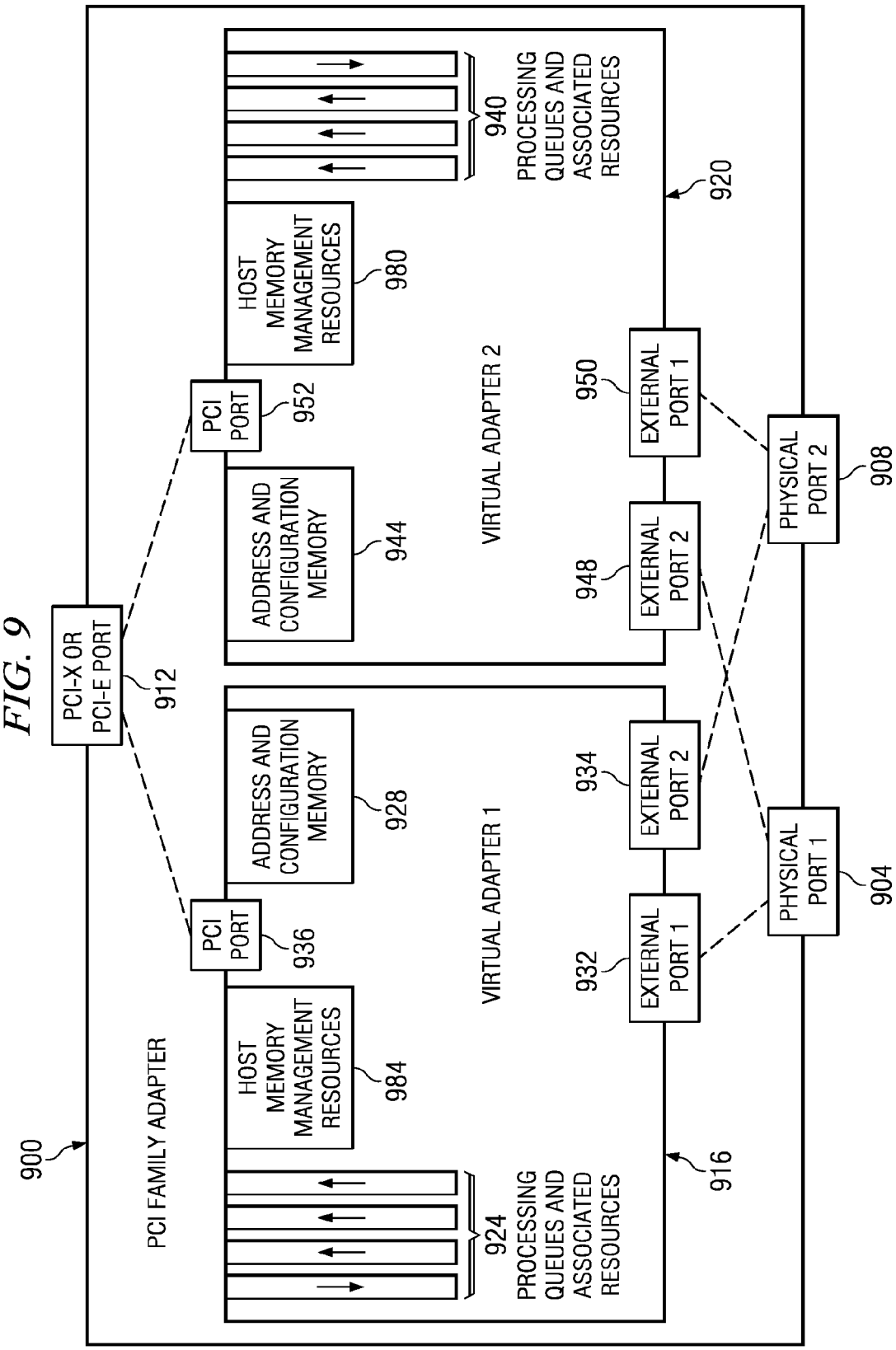
FIG. 9 is a diagram illustrating the adapter resources that are virtualized in order to allow: an adapter to directly access virtual host resources; allow a virtual host to directly access adapter resources; and allow a non-PCI port on the adapter to access resources on the adapter or host in accordance with a preferred embodiment of the present invention.

With reference now to FIG. 9, a functional block diagram of a PCI adapter with two virtual adapters depicted in accordance with a preferred embodiment of the present invention is shown. Exemplary PCI family adapter 900 is configured with two virtual adapters 916 and 920 (illustratively designated virtual adapter 1 and virtual adapter 2). PCI family adapter 900 may contain one (or more) PCI family adapter ports (also referred to herein as an upstream port), such as PCI-X or PCI-E adapter port 912 that interface with a host system, such as small host node 100, large host node 124, or small integrated host node 144 shown in FIG. 1. PCI family adapter 900 may also contain one (or more) device or network ports (also referred to herein as downstream ports), such as physical port 904 and physical port 908 that interface with a peripheral or network device.

FIG. 9 also shows the types of resources that can be virtualized on a PCI adapter. The resources of PCI family adapter 900 that may be virtualized include processing queues, address and configuration memory, adapter PCI ports, host memory management resources and downstream physical ports, such as device or network ports. In the illustrative example, virtualized resources of PCI family adapter 900 allocated to virtual adapter 916 include, for example, processing queues 924, address and configuration memory 928, PCI virtual port 936 that is a virtualization of adapter PCI port 912, host memory management resources 984 (such as memory region registration and memory window binding resources on InfiniBand or iWARP), and virtual device or network ports, such as virtual external port 932 and virtual external port 934 that are virtualizations of physical ports 904 and 908. PCI virtual ports and virtual device and network ports are also referred to herein simply as virtual ports. Similarly, virtualized resources of PCI family adapter 900 allocated to virtual adapter 920 include, for example, processing queues 940, address and configuration memory 944, PCI virtual port 952 that is a virtualization of adapter PCI port 912, host memory management resources 980, and virtual device or network ports, such as virtual external port 948 and virtual external port 950 that are respectively virtualizations of respective physical ports 904 and 908.

Figure 10:
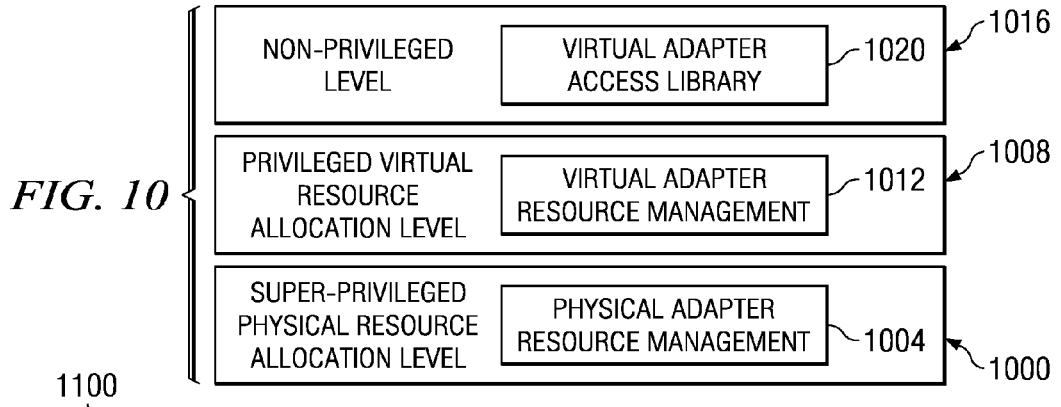
FIG. 10 is a diagram illustrating the creation of the three access control levels used to manage a PCI family adapter that supports I/O virtualization in accordance with a preferred embodiment of the present invention.

Turning next to FIG. 10, a functional block diagram of the access control levels on a PCI family adapter, such as PCI family adapter 900 shown in FIG. 9, is depicted in accordance with a preferred embodiment of the present invention. The three levels of access are a super-privileged physical resource allocation level 1000, a privileged virtual resource allocation level 1008, and a non-privileged level 1016.

The functions performed at the super-privileged physical resource allocation level 1000 include but are not limited to: PCI family adapter queries, creation, modification and deletion of virtual adapters, submission and retrieval of work, reset and recovery of the physical adapter, and allocation of physical resources to a virtual adapter instance. The PCI family adapter queries are used to determine, for example, the physical adapter type (e.g. Fibre Channel, Ethernet, iSCSI, parallel SCSI), the functions supported on the physical adapter, and the number of virtual adapters supported by the PCI family adapter. The LPAR manager, such as LPAR manager 708 shown in FIG. 7, performs the physical adapter resource management 1004 functions associated with super-privileged physical resource allocation level 1000. However, the LPAR manager may use a system image, for example an I/O hosting partition, to perform the physical adapter resource management 1004 functions.

The functions performed at the privileged virtual resource allocation level 1008 include, for example, virtual adapter queries, allocation and initialization of virtual adapter resources, reset and recovery of virtual adapter resources, submission and retrieval of work through virtual adapter resources, and, for virtual adapters that support offload services, allocation and assignment of virtual adapter resources to a middleware process or thread instance. The virtual adapter queries are used to determine: the virtual adapter type (e.g. Fibre Channel, Ethernet, iSCSI, parallel SCSI) and the functions supported on the virtual adapter. A system image, such as system image 712 shown in FIG. 7, performs the privileged virtual adapter resource management 1012 functions associated with virtual resource allocation level 1008.

Finally, the functions performed at the non-privileged level 1016 include, for example, query of virtual adapter resources that have been assigned to software running at the non-privileged level 1016 and submission and retrieval of work through virtual adapter resources that have been assigned to software running at the non-privileged level 1016. An application, such as application 716 shown in FIG. 7, performs the virtual adapter access library 1020 functions associated with non-privileged level 1016.

Figure 11:
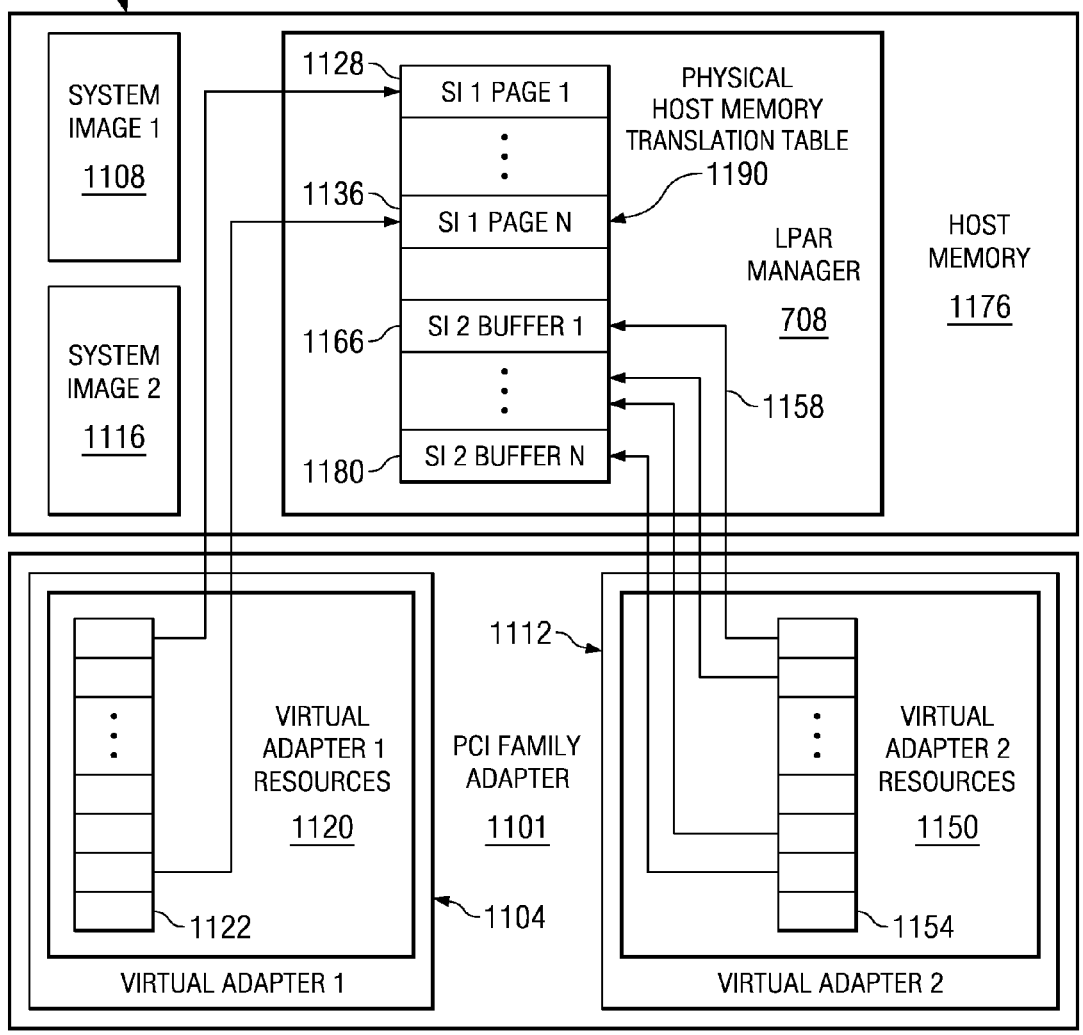
FIG. 11 is a diagram illustrating how host memory that is associated with a system image is made available to a virtual adapter that is associated with a system image through an LPAR manager in accordance with a preferred embodiment of the present invention.

Turning next to FIG. 11, a functional block diagram of host memory addresses that are made accessible to a PCI family adapter is depicted in accordance with a preferred embodiment of the present invention. PCI family adapter 1101 is an example of PCI family adapter 900 that may have virtualized resources as described above in FIG. 9.

FIG. 11 depicts four different mechanisms by which a LPAR manager 708 can associate host memory to a system image and to a virtual adapter. Once host memory has been associated with a system image and a virtual adapter, the virtual adapter can then perform DMA write and read operations directly to the host memory. System images 1108 and 1116 are examples of system images, such as system images 712 and 724 described above with reference to FIG. 7, that are respectively associated with virtual adapters 1104 and 1112. Virtual adapters 1104 and 1112 are examples of virtual adapters, such as virtual adapters 916 and 920 described above with reference to FIG. 9, that comprise respective allocations of virtual adapter resources and virtual adapter memory.

The first exemplary mechanism that LPAR manager 708 can use to associate and make available host memory to a system image and to one or more virtual adapters is to write into the virtual adapter's resources a system image association list 1122. Virtual adapter resources 1120 contains a list of PCI bus addresses, where each PCI bus address in the list is associated by the platform hardware to the starting address of a system image (SI) page, such as SI 1 page 1 1128 through SI 1 page N 1136 allocated to system image 1106. Virtual adapter resources 1120 also contains the page size, which is equal for all the pages in the list. At initial configuration, and during reconfigurations, LPAR manager 708 loads system image association list 1122 into virtual adapter resources 1120. The system image association list 1122 defines the set of addresses that virtual adapter 1104 can use in DMA write and read operations. After the system image association list 1122 has been created, virtual adapter 1104 must validate that each DMA write or DMA read requested by system image 1108 is contained within a page in the system image association list 1122. If the DMA write or DMA read requested by system image 1108 is contained within a page in the system image association list 1122, then virtual adapter 1104 may perform the operation. Otherwise virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 validates DMA write or read requests submitted by system image 1116. Particularly, virtual adapter 1112 provides validation for DMA read and write requests from system image 1116 by determining whether the DMA write or read request is in a page in system image association list (configured in a manner similarly to system image association list 1122) associated with system image pages of system image 1116.

The second mechanism that LPAR manager 708 can use to associate and make available host memory to a system image and to one or more virtual adapters is to write a starting page address and page size into system image association list 1122 in the virtual adapter's resources. For example, virtual adapter resources 1120 may contain a single PCI bus address that is associated by the platform hardware to the starting address of a system image page, such as SI 1 Page 1 1128. System image association list 1122 in virtual adapter resources 1120 also contains the size of the page. At initial configuration, and during reconfigurations, LPAR manager 708 loads the page size and starting page address into system image association list 1122 into the virtual adapter resources 1120. The system image association list 1122 defines the set of addresses that virtual adapter 1104 can use in DMA write and read operations. After the system image association list 1122 has been created, virtual adapter 1104 validates whether each DMA write or DMA read requested by system image 1108 is contained within a page in system image association list 1122. If the DMA write or DMA read requested by system image 1108 is contained within a page in the system image association list 1122, then virtual adapter 1104 may perform the operation. Otherwise, virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 may validate DMA write or read requests submitted by system image 1116. Particularly, a system image association list similar to system image association list 1122 may be associated with virtual adapter 1112. The system image association list associated with virtual adapter 1112 is loaded with a page size and starting page address of a system image page of system image 1116 associated with virtual adapter 1112. The system image association list associated with virtual adapter 1112 thus provides a mechanism for validation of DMA read and write requests from system image 1116 by determining whether the DMA write or read request is in a page in a system image association list associated with system image pages of system image 1116.

The third mechanism that LPAR manager 708 can use to associate and make available host memory to a system image and to one or more virtual adapters is to write into the virtual adapter's resources a system image buffer association list 1154. In FIG. 11, virtual adapter resources 1150 contains a list of PCI bus address pairs (starting and ending address), where each pair of PCI bus addresses in the list is associated by the platform hardware to a pair (starting and ending) of addresses of a system image buffer, such as SI 2 Buffer 1 1166 through SI 2 Buffer N 1180 allocated to system image 1116. At initial configuration, and during reconfigurations, LPAR manager 708 loads system image buffer association list 1154 into the virtual adapter resources 1150. The system image buffer association list 1154 defines the set of addresses that virtual adapter 1112 can use in DMA write and read operations. After the system image buffer association list 1154 has been created, virtual adapter 1112 validates whether each DMA write or DMA read requested by system image 1116 is contained within a buffer in system image buffer association list 1154. If the DMA write or DMA read requested by system image 1116 is contained within a buffer in the system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1112) to perform the check that determines if DMA write or DMA read operations requested by system image 1116 is contained within a buffer in the system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains PCI bus starting and ending address pairs in association with system image buffer starting and ending address pairs of buffers allocated to system image 1108 in a manner similar to that described above for system image 1116 and virtual adapter 1112.

The fourth mechanism that LPAR manager 708 can use to associate and make available host memory to a system image and to one or more virtual adapters is to write into the virtual adapter's resources a single starting and ending address in system image buffer association list 1154. In this implementation, virtual adapter resources 1150 contains a single pair of PCI bus starting and ending address that is associated by the platform hardware to a pair (starting and ending) of addresses associated with a system image buffer, such as SI 2 Buffer 1 1166. At initial configuration, and during reconfigurations, LPAR manager 708 loads the starting and ending addresses of SI 2 buffer 1 1166 into the system image buffer association list 1154 in virtual adapter resources 1150. The system image buffer association list 1154 then defines the set of addresses that virtual adapter 1112 can use in DMA write and read operations. After the system image buffer association list 1154 has been created, virtual adapter 1112 validates whether each DMA write or DMA read requested by system image 1116 is contained within the system image buffer association list 1154. If the DMA write or DMA read requested by system image 1116 is contained within system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1150) to perform the check that determines if DMA write or DMA read requested by system image 1116 is contained within a page system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains a single PCI bus starting and ending address in association with a system image buffer starting and ending address allocated to system image 1108 in a manner similar to that described above for system image 1116 and virtual adapter 1112.

Figure 12:
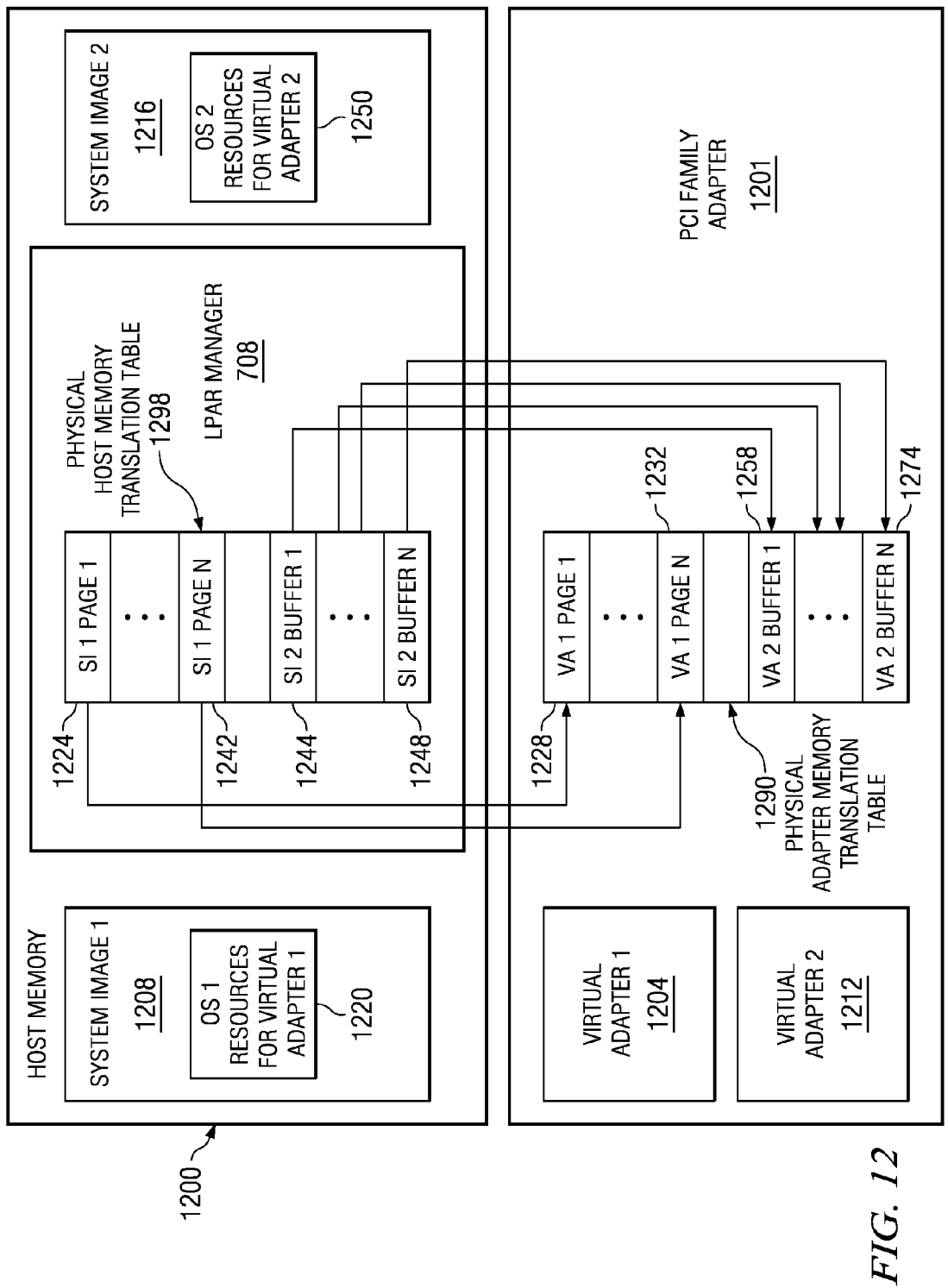
FIG. 12 is a diagram illustrating how a PCI family adapter allows an LPAR manager to associate memory in the PCI adapter to a system image and its associated virtual adapter in accordance with a preferred embodiment of the present invention.

Turning next to FIG. 12, a functional block diagram of a PCI family adapter configured with memory addresses that are made accessible to a system image is depicted in accordance with a preferred embodiment of the present invention.

FIG. 12 depicts four different mechanisms by which a LPAR manager can associate PCI family adapter memory to a virtual adapter, such as virtual adapter 1204, and to a system image, such as system image 1208. Once PCI family adapter memory has been associated to a system image and a virtual adapter, the system image can then perform Memory Mapped I/O write and read (i.e., store and load) operations directly to the PCI family adapter memory.

A notable difference between the system image and virtual adapter configuration shown in FIG. 11 and FIG. 12 exists. In the configuration shown in FIG. 11, PCI family adapter 1101 only holds a list of host addresses that do not have any local memory associated with them. If the PCI family adapter supports flow-through traffic, then data arriving on an external port can directly flow through the PCI family adapter and be transferred, through DMA writes, directly into these host addresses. Similarly, if the PCI family adapter supports flow-through traffic, then data from these host addresses can directly flow through the PCI family adapter and be transferred out of an external port. Accordingly, PCI family adapter 1101 shown in FIG. 11 does not include local adapter memory and thus is unable to initiate a DMA operation. On the other hand, PCI family adapter 1201 shown in FIG. 12 has local adapter memory that is associated with the list of host memory addresses. PCI family adapter 1201 can initiate, for example, DMA writes from its local memory to the host memory or DMA reads from the host memory to its local memory. Similarly, the host can initiate, for example, Memory Mapped I/O writes from its local memory to the PCI family adapter memory or Memory Mapped I/O reads from the PCI family adapter memory to the host's local memory.

The first and second mechanisms that LPAR manager 708 can use to associate and make available PCI family adapter memory to a system image and to a virtual adapter is to write into the PCI family adapter's physical adapter memory translation table 1290 a page size and the starting address of one (first mechanism) or more (second mechanism) pages. In this case all pages have the same size. For example, FIG. 12 depicts a set of pages that have been mapped between system image 1208 and virtual adapter 1204. Particularly, SI 1 Page 1 1224 through SI 1 Page N 1242 of system image 1208 are mapped (illustratively shown by interconnected arrows) to virtual adapter memory pages 1224-1232 of physical adapter 1201 local memory. For system image 1208, all associated pages 1224-1242 in the list have the same size. At initial configuration, and during reconfigurations, LPAR manager 708 loads the PCI family adapter's physical adapter memory translation table 1290 with the page size and the starting address of one or more pages. The physical adapter memory translation table 1290 then defines the set of addresses that virtual adapter 1204 can use in DMA write and read operations. After physical adapter memory translation table 1290 has been created, PCI family adapter 1201 (or virtual adapter 1204) validates that each DMA write or DMA read requested by system image 1208 is contained in the physical adapter memory translation table 1290 and is associated with virtual adapter 1204. If the DMA write or DMA read requested by system image 1208 is contained in the physical adapter memory translation table 1290 and is associated with virtual adapter 1204, then virtual adapter 1204 may perform the operation. Otherwise, virtual adapter 1204 is prohibited from performing the operation. The physical adapter memory translation table 1290 also defines the set of addresses that system image 1208 can use in Memory Mapped I/O (MMIO) write and read operations. After physical adapter memory translation table 1290 has been created, PCI family adapter 1201 (or virtual adapter 1204) validates whether the Memory Mapped I/O write or read requested by system image 1208 is contained in the physical adapter memory translation table 1290 and is associated with virtual adapter 1204. If the MMIO write or MMIO read requested by system image 1208 is contained in the physical adapter memory translation table 1290 associated with virtual adapter 1204, then virtual adapter 1204 may perform the operation. Otherwise virtual adapter 1204 is prohibited from performing the operation. It should be understood that in the present example, other system images and associated virtual adapters, e.g., system image 1216 and virtual adapter 1212, are configured in a similar manner for PCI family adapter 1201 (or virtual adapter 1212) validation of DMA operations and MMIO operations requested by system image 1216.

The third and fourth mechanisms that LPAR manager 708 can use to associate and make available PCI family adapter memory to a system image and to a virtual adapter is to write into the PCI family adapter's physical adapter memory translation table 1290 one (third mechanism) or more (fourth mechanism) buffer starting and ending addresses (or starting address and length). In this case, the buffers may have different sizes. For example, FIG. 12 depicts a set of varying sized buffers that have been mapped between system image 1216 and virtual adapter 1212. Particularly, SI 2 Buffer 1 1244 through SI 2 Buffer N 1248 of system image 1216 are mapped to virtual adapter buffers 1258-1274 of virtual adapter 1212. For system image 1216, the buffers in the list have different sizes. At initial configuration, and during reconfigurations, LPAR manager 708 loads the PCI family adapter's physical adapter memory translation table 1290 with the starting and ending address (or starting address and length) of one or more pages. The physical adapter memory translation table 1290 then defines the set of addresses that virtual adapter 1212 can use in DMA write and read operations. After physical adapter memory translation table 1290 has been created, PCI family adapter 1201 (or virtual adapter 1212) validates that each DMA write or DMA read requested by system image 1216 is contained in the physical adapter memory translation table 1290 and is associated with virtual adapter 1212. If the DMA write or DMA read requested by system image 1216 is contained in the physical adapter memory translation table 1290 and is associated with virtual adapter 1212, then virtual adapter 1212 may perform the operation. Otherwise, virtual adapter 1212 is prohibited from performing the operation. The physical adapter memory translation table 1290 also defines the set of addresses that system image 1216 can use in Memory Mapped I/O (MMIO) write and read operations. After physical adapter memory translation table 1290 has been created, PCI family adapter 1201 (or virtual adapter 1212) validates whether a MMIO write or read requested by system image 1216 is contained in the physical adapter memory translation table 1290 and is associated with virtual adapter 1212. If the MMIO write or MMIO read requested by system image 1216 is contained in the physical adapter memory translation table 1290 and is associated with virtual adapter 1212, then virtual adapter 1212 may perform the operation. Otherwise virtual adapter 1212 is prohibited from performing the operation. It should be understood that in the present example, other system images and associated virtual adapters, e.g., system image 1208 and associated virtual adapter 1204, are configured in a similar manner for PCI family adapter 1201 (or virtual adapter 1204) validation of DMA operations and MMIO operations requested by system image 1216.

Figure 13:
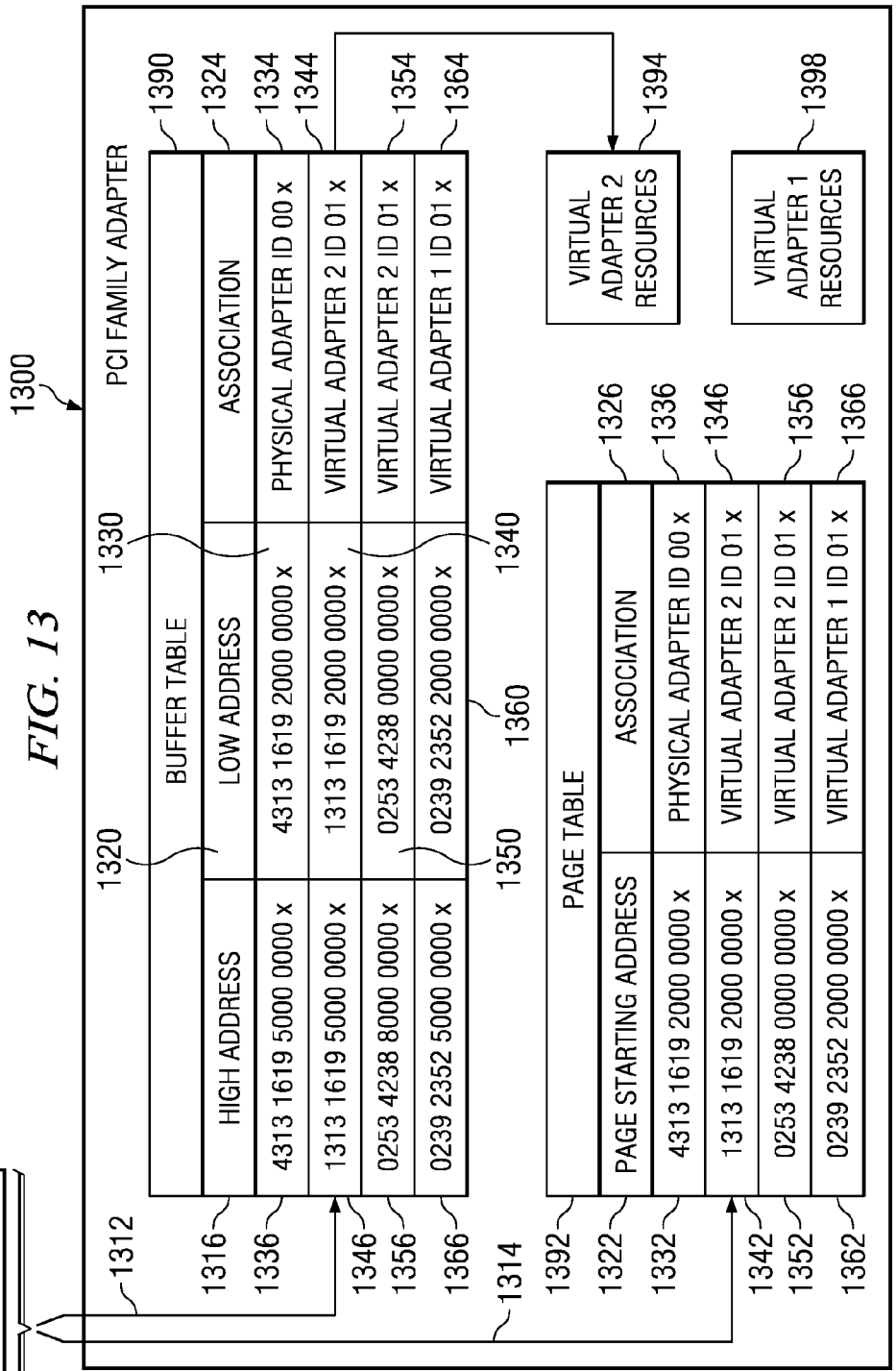
FIG. 13 is a diagram illustrating one of the options for determining a virtual adapter is associated with an incoming memory address to assure that the functions performed by an incoming PCI bus transaction are within the scope of the virtual adapter that is associated with the memory address referenced in the incoming PCI bus transaction translation in accordance with a preferred embodiment of the present invention.

With reference next to FIG. 13, a functional block diagram of a PCI family adapter and a physical address memory translation table, such as a buffer table or a page table, is depicted in accordance with a preferred embodiment of the present invention.

FIG. 13 also depicts four mechanisms for how an address referenced in an incoming PCI bus transaction 1304 can be used to look up the virtual adapter resources (including the local PCI family adapter memory address that has been mapped to the host address), such as virtual adapter resources 1394 or 1398, associated with the memory address.

The first mechanism is to compare the memory address of incoming PCI bus transaction 1304 with each row of high address cell 1316 and low address cell 1320 in buffer table 1390. High address cell 1316 and low address cell 1320 respectively define an upper and lower address of a range of addresses associated with a corresponding virtual or physical adapter identified in association cell 1324. If incoming PCI bus transaction 1304 has an address that is lower than the contents of high address cell 1316 and that is higher than the contents of low address cell 1320, then incoming PCI bus transaction 1304 is within the high address and low address cells that are associated with the corresponding virtual adapter identified in association cell 1324. In such a scenario, the incoming PCI bus transaction 1304 is allowed to be performed on the matching virtual adapter. Alternatively, if incoming PCI bus transaction 1304 has an address that is not between the contents of high address cell 1316 and the contents of low address cell 1320, then completion or processing of incoming PCI bus transaction 1304 is prohibited. The second mechanism is to simply allow a single entry in buffer table 1390 per virtual adapter.

The third mechanism is to compare the memory address of incoming PCI bus transaction 1304 with each row of page starting address cell 1322 and with each row of page starting address cell 1322 plus the page size in page table 1392. If incoming PCI bus transaction 1304 has an address that is higher than or equal to the contents of page starting address cell 1322 and lower than page starting address cell 1322 plus the page size, then incoming PCI bus transaction 1304 is within a page that is associated with a virtual adapter. Accordingly, incoming PCI bus transaction 1304 is allowed to be performed on the matching virtual adapter. Alternatively, if incoming PCI bus transaction 1304 has an address that is not within the contents of page starting address cell 1322 and page starting address cell 1322 plus the page size, then completion of incoming PCI bus transaction 1304 is prohibited. The fourth mechanism is to simply allow a single entry in page table 1392 per virtual adapter.

Figure 14:
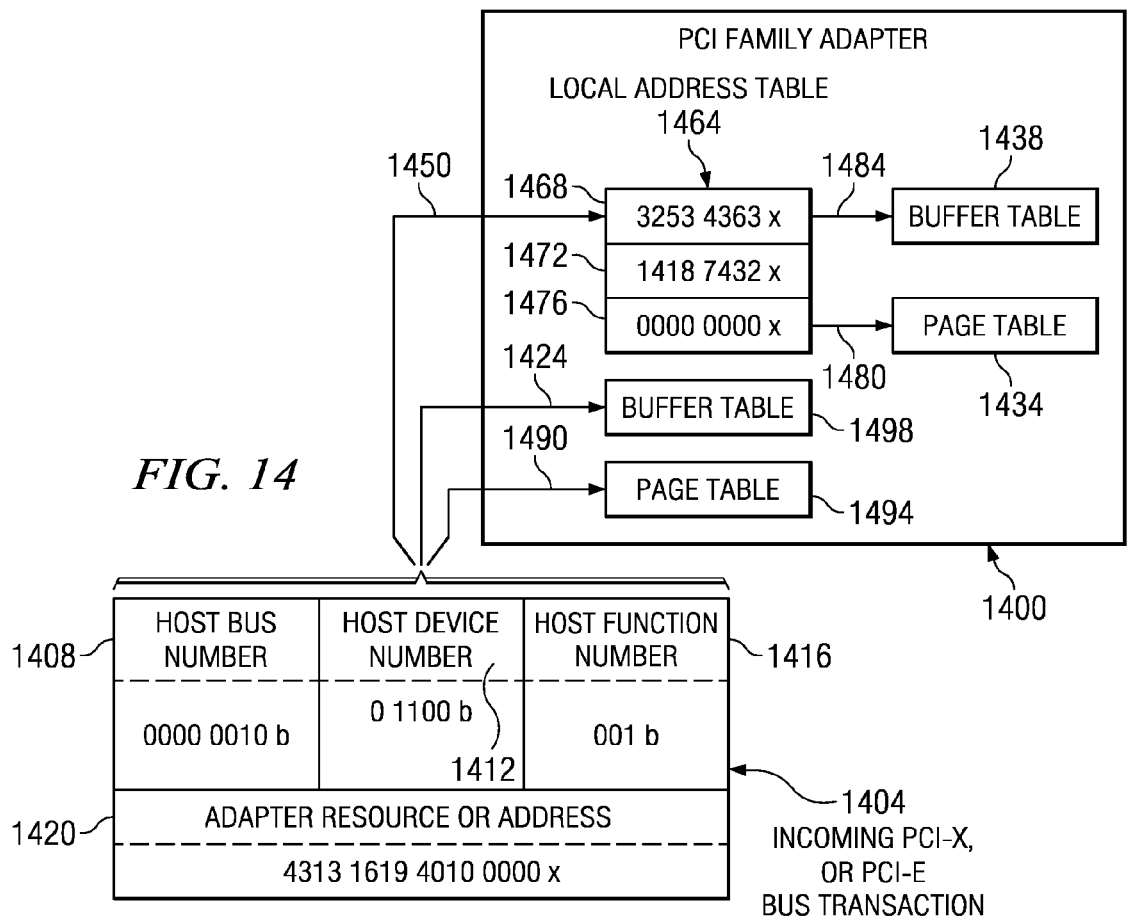
FIG. 14 is a diagram illustrating one of the options for determining a virtual adapter is associated with a PCI-X or PCI-E bus transaction to assure that the functions performed by an incoming PCI bus transaction are within the scope of the virtual adapter that is associated with the requestor bus number, requestor device number, and requester function number referenced in the incoming PCI bus transaction translation in accordance with a preferred embodiment of the present invention.

With reference next to FIG. 14, a functional block diagram of a PCI family adapter and a physical address memory translation table, such as a buffer table, a page table, or an indirect local address table, is depicted in accordance with a preferred embodiment of the present invention.

FIG. 14 also depicts several mechanisms for how a requestor bus number, such as host bus number 1408, a requestor device number, such as host device number 1412, and a requester function number, such as host function number 1416, referenced in incoming PCI bus transaction 1404 can be used to index into either buffer table 1498, page table 1494, or indirect local address table 1464. Buffer table 1498 is representative of buffer table 1390 shown in FIG. 13. Page table 1490 is representative of page table 1392 shown in FIG. 13. Local address table 1464 contains a local PCI family adapter memory address that references either a buffer table, such as buffer table 1438, or a page table, such as page table 1434, that only contains host memory addresses that are mapped to the same virtual adapter.

The requester bus number, such as host bus number 1408, requestor device number, such as host device number 1412, and requestor function number, such as host function number 1416, referenced in incoming PCI bus transaction 1404 provides an additional check beyond the memory address mappings that were set up by a host LPAR manager.

Figure 15:
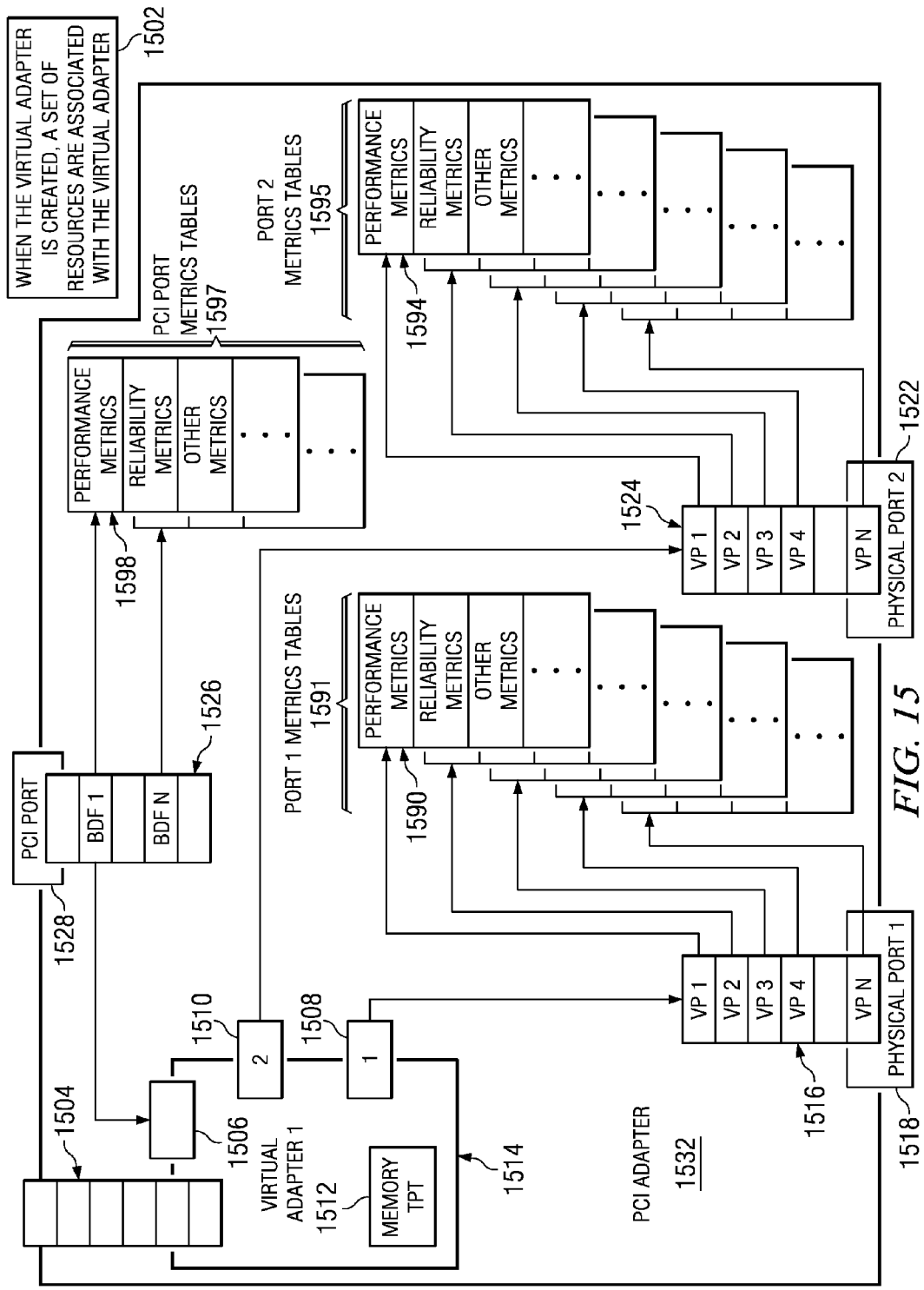
FIG. 15 is a diagram illustrating a virtual adapter management approach for adapter virtualization in accordance with a preferred embodiment of the present invention.

Turning next to FIG. 15, a virtual adapter level management approach is depicted in accordance with a preferred embodiment of the present invention. Under this approach, a physical or virtual host creates one or more virtual adapters, such as virtual adapter 1514, that each contain a set of resources within the scope of the physical adapter, such as PCI adapter 1532. Each virtual adapter is associated with a host side system image. A virtual adapter comprises a collection of resources (either virtualized or partitioned) of the physical adapter. By defining a virtual adapter entity, all virtual resources associated with a system image can be collectively manipulated by directing an action to the corresponding virtual adapter. For example, a virtual adapter (and all included virtual resources) can be created, destroyed, or modified by performing a function targeting the corresponding virtual adapter. Additionally, the virtual adapter management approach allows all resources of a virtual adapter to be identified with a single identifier, e.g., a bus, device, and function number, that is associated with the virtual adapter. The set of resources associated with virtual adapter 1514 may include, for example: processing queues and associated resources 1504, PCI port 1528 for each PCI physical port on PCI adapter 1532, a PCI virtual port 1506 that is associated with one of the possible addresses on adapter PCI port 1528, one or more downstream physical ports 1518 and 1522 for each downstream physical port on PCI adapter 1532, downstream virtual port 1508 and 1510 that is respectively associated with one of the possible addresses on physical port 1518 and 1522, and one or more address translation and protection tables (ATPTs) 1512.

FIG. 15 also depicts a set of PCI metrics tables, such a PCI port metrics tables 1597, for each adapter PCI port, such as adapter PCI port 1528, on PCI adapter 1532. In the illustrative example, each PCI virtual port has an identifier comprising a bus, device, and function number associated therewith. For example, PCI virtual port 1506 has an identifier BDF 1 associated therewith. Each PCI virtual port, such as PCI virtual port 1506 having identifier BDF 1 in the PCI port's 1528 virtual port table 1526, contains a pointer or another suitable reference to the PCI virtual port's metric table, such as PCI virtual port's 1506 metric table 1598, which is associated with the PCI virtual port. The table contains a list of performance, reliability, and other metrics that are associated with incoming and outgoing operations which target the PCI virtual port.

FIG. 15 depicts a set of downstream metrics tables, such as Port 1 metrics tables 1591 and Port 2 metrics tables 1595, for each downstream physical port, such as physical port 1518 and physical port 1522, on PCI adapter 1532. Each downstream virtual port, such as virtual port 1508 (designated VP 1) in the physical port's 1518 virtual port table 1516, contains a pointer to the downstream virtual port's metric table, such as downstream virtual port's 1508 metric table 1590, which is associated with the downstream virtual port. The table contains a list of performance, reliability, and other metrics that are associated with incoming and outgoing operations which target the PCI virtual port.

Figure 16:
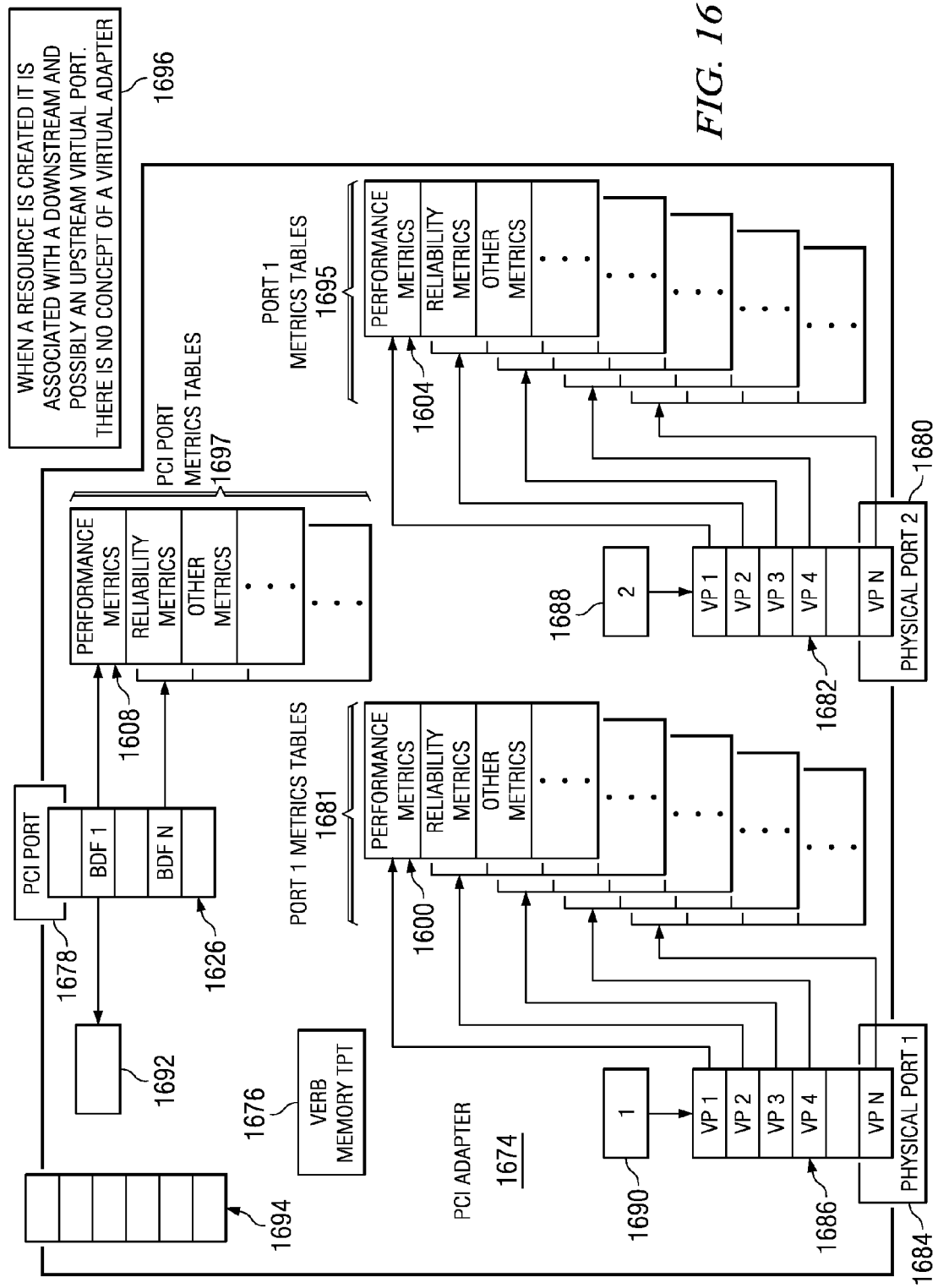
FIG. 16 is a diagram illustrating a virtual resource management approach for adapter virtualization in accordance with a preferred embodiment of the present invention.

Turning next to FIG. 16, a virtual resource level (VRL) management approach is depicted in accordance with a preferred embodiment of the present invention. Under this approach, a physical or virtual host creates one or more virtual resources, such as a processing queue 1694, a virtual PCI port 1692, a virtual downstream port 1688 and 1690, and a memory translation and protection table (ATPT) 1676.

FIG. 16 also depicts a set of PCI metrics tables, such a PCI port metrics table 1697, for each PCI port, such as PCI port 1678, on PCI adapter 1674. Each PCI virtual port, such as a virtual port 1692 assigned bus, device and function numbers BDF 1, in adapter PCI port's 1678 virtual port table 1626 contains a pointer to the PCI virtual port's metric table. In the illustrative example, metric table 1608 is associated with PCI virtual port 1692 having the bus, device and function numbers BDF 1 (or another suitable identifier) assigned thereto. The table contains a list of performance, reliability, and other metrics that are associated with incoming and outgoing operations which target the PCI virtual port.

FIG. 16 depicts a set of downstream metrics tables, such as physical port 1684 metrics table 1600 and physical port 1680 metrics table 1604, for each downstream physical port, such as physical port 1 1684 (designated Phys. port 1) and physical port 1680 (designated Phys. port 2), on PCI adapter 1674. Each downstream virtual port, such as virtual port 1690 designated VP 1 in physical port's 1684 virtual port table 1686, contains a pointer to the downstream virtual port's metric table, such as downstream virtual port's 1690 metric table 1600, which is associated with downstream virtual port 1690. The table contains a list of performance, reliability, and other metrics that are associated with incoming and outgoing operations which target the PCI virtual port.

Figure 17:
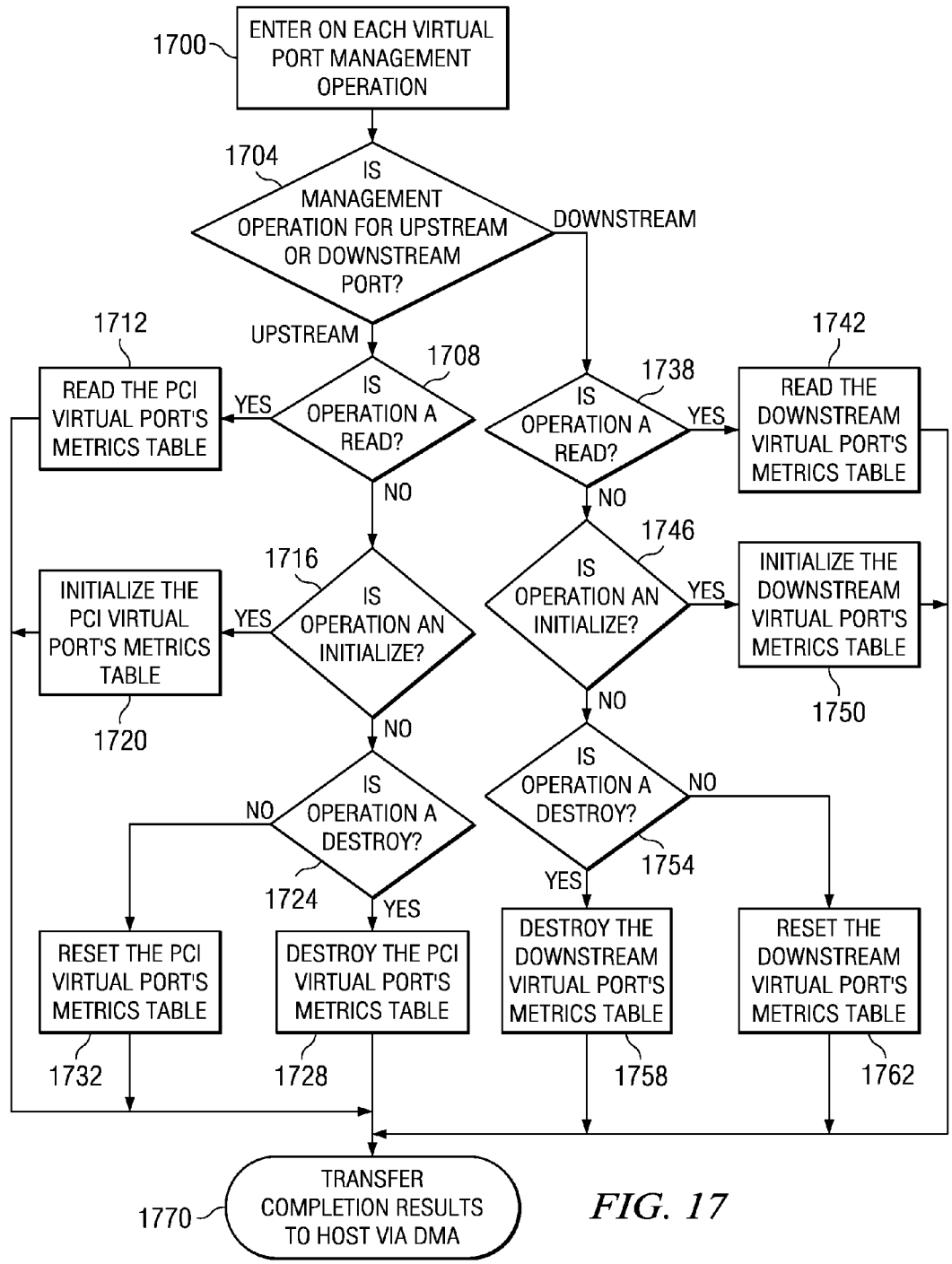
FIG. 17 is a flowchart outlining the functions used on an adapter that provide a mechanism to manage metrics associated with the adapter's virtual ports in accordance with a preferred embodiment of the present invention.

FIG. 17 is a flowchart of an exemplary metrics table management routine used by a PCI adapter to manage a table that holds per virtual port metrics in accordance with a preferred embodiment of the present invention.

The metrics table management routine is entered when a system image, LPAR manager, or an LPAR manager appointed intermediary wants to perform a management operation on one of the PCI adapter's virtual ports (step 1700).

The adapter then determines whether the management operation is for an upstream or downstream PCI port. If the management operation is for an upstream PCI port, then the management routine proceeds to determine if the management operation is a read (step 1708).

If the PCI adapter determines that the management operation is a read of the upstream PCI virtual port's metrics, then the PCI adapter reads the upstream PCI virtual port's metrics (step 1712). Thereafter, the PCI adapter transfers the metrics and the management operation completion results to the host through a direct memory access (DMA) operation (step 1770).

Returning again to step 1708, if the operation is not evaluated as a read, the PCI adapter then determines if the management operation is an Initialize of the virtual port's metrics (step 1716). If the management operation is identified as an Initialize operation at step 1716, the PCI adapter initializes the PCI virtual port's metrics (step 1720). For example, the PCI adapter may allocate an upstream PCI virtual port table, assign the allocated upstream PCI virtual port table to the upstream PCI virtual port referenced in the management operation, and reset the upstream PCI virtual port's metrics to zero. The PCI adapter transfers the completion results to the host through a Direct Memory Access (DMA) PCI operation according to step 1770.

Returning again to step 1716, if the management operation is not identified as an initialize, the PCI adapter then determines if the management operation is a Destroy of the upstream PCI virtual port's metrics (step 1724). If the management operation is identified as a Destroy, then the PCI adapter destroys an upstream PCI virtual port metric table (step 1728), and transfers the completion results to the host through a DMA PCI operation according to step 1770. Otherwise, if the management operation is not identified as a destroy operation at step 1724, the PCI adapter resets the upstream PCI virtual port's metrics table to zero (step 1732), and transfers the completion results to the host through a DMA PCI operation according to step 1770.

Returning again to step 1704, if the management operation is identified as a downstream operation, the PCI adapter determines if the management operation is a Read of the downstream virtual port's metrics (step 1738). If the management operation is identified as a Read operation, then the PCI adapter reads the downstream virtual port's metrics (step 1742) and transfers the metrics and the management operation completion results to the host through a DMA PCI operation according to step 1770.

Returning again to step 1738, if the management operation is not identified as a read operation, the PCI adapter then determines if the management operation is an Initialize of the downstream virtual port's metrics (step 1746). If the management operation is identified as an Initialize operation, then the PCI adapter initializes the downstream virtual port's metrics table (step 1750). For example, the PCI adapter may allocate a downstream virtual port table, assign the allocated downstream virtual port table to the downstream virtual port referenced in the management operation, and reset the downstream virtual port's metrics to zero. The PCI adapter then transfers the completion results to the host through a DMA PCI operation according to step 1770.

Returning again to step 1746, if the management operation is not identified as an initialize operation, the PCI adapter determines if the management operation is a Destroy of the downstream virtual port's metrics (step 1754). If the management operation is identified as a Destroy, then the PCI adapter destroys a downstream virtual port metric table (step 1758), and transfers the completion results to the host through a DMA PCI operation according to step 1770. Otherwise, if the management operation is not identified as a destroy at step 1754, the PCI adapter resets the downstream virtual port's metrics to zero (step 1762), and transfers the completion results to the host through a DMA PCI operation according to step 1770.

Figure 18:
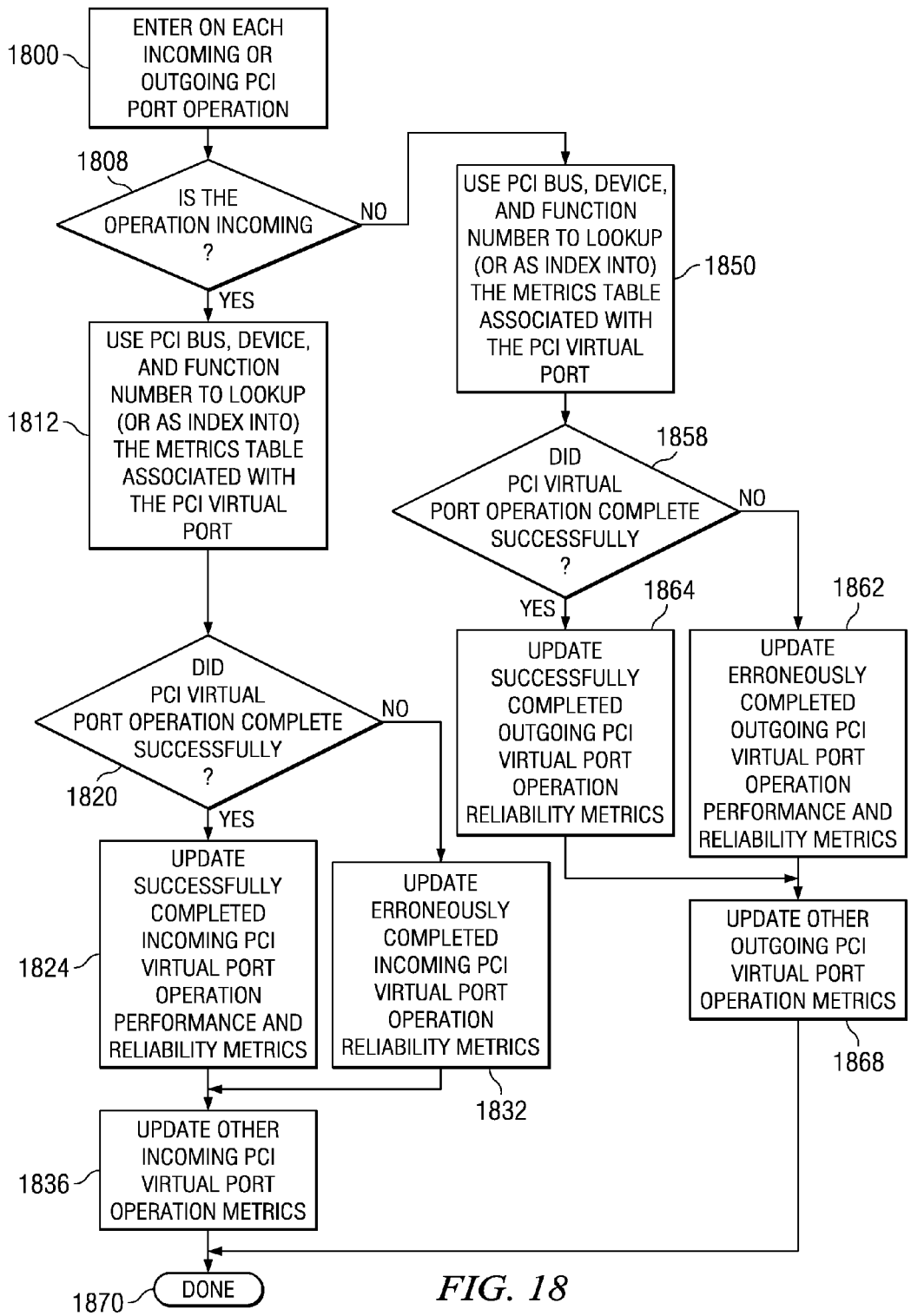
FIG. 18 is a flowchart outlining functions performed at run-time on an adapter used to maintain performance, reliability, and other metrics per PCI virtual port in accordance with a preferred embodiment of the present invention.

FIG. 18 is a flowchart outlining a run-time operations routine performed at run-time on incoming or outgoing operations that target the PCI port of an adapter that provides metrics per virtual port in accordance with a preferred embodiment of the present invention.

The run-time operations routine is entered when an incoming or outgoing operation targets the PCI port of an adapter that provides metrics per virtual port (step 1800).

The adapter then determines if the operation is incoming or outgoing (step 1808). If the operation is an incoming PCI operation, the PCI adapter uses the PCI bus, device, and function numbers to lookup (or as index into) the metrics table associated with the PCI virtual port (step 1812).

An evaluation is then made to determine if the operation successfully completed (step 1820). If the PCI operation completes successfully, then the adapter updates the successfully completed incoming PCI virtual port operation performance and reliability metrics (step 1824), and then proceeds to update other incoming PCI virtual port metrics (step 1836). The run-time routine then ends (step 1870). If it is determined that the virtual port operation did not successfully complete at step 1820, then the adapter updates the erroneously completed incoming PCI virtual port operation reliability metrics (step 1832) and then proceeds to update other incoming PCI virtual port operation metrics according to step 1836.

Table A depicts examples of various performance metrics and mechanisms for updating the exemplary metrics in any one or more of steps 1824, 1832, and 1836.

TABLE A

| Metric type and metric | Successful PCI Operation completion results in metric being: |
|---|---|
| Performance Metrics | |
| Total Number of Incoming PCI Operations | Incremented by 1 |
| Total Number of Incoming Bytes | Incremented by the number of data bytes in the incoming PCI operation |
| Total Number of Incoming PCI Operations for traffic class 1 | Incremented by 1 if the incoming PCI operation targets traffic class 1 |
| Total Number of Incoming Bytes for traffic class 1 | Incremented by the number of data bytes in the incoming PCI operation if the incoming PCI operation targets traffic class 1 |
| Total Number of Incoming PCI Operations for traffic class 2 | Incremented by 1 if the incoming PCI operation targets traffic class 2 |
| Total Number of Incoming Bytes for traffic class 2 | Incremented by the number of data bytes in the incoming PCI operation if the incoming PCI operation targets traffic class 2 |
| Total Number of Incoming PCI Operations for traffic class 3 | Incremented by 1 if the incoming PCI operation targets traffic class 3 |
| Total Number of Incoming Bytes for traffic class 3 | Incremented by the number of data bytes in the incoming PCI operation if the incoming PCI operation targets traffic class 3 |
| Total Number of Incoming PCI Operations for traffic class 4 | Incremented by 1 if the incoming PCI operation targets traffic class 4 |
| Total Number of Incoming Bytes for traffic class 4 | Incremented by the number of data bytes in the incoming PCI operation if the incoming PCI operation targets traffic class 4 |
| Total Number of Incoming PCI Operations for traffic class 5 | Incremented by 1 if the incoming PCI operation targets traffic class 5 |
| Total Number of Incoming Bytes for traffic class 5 | Incremented by the number of data bytes in the incoming PCI operation if the incoming PCI operation targets traffic class 5 |
| Total Number of Incoming PCI Operations for traffic class 6 | Incremented by 1 if the incoming PCI operation targets traffic class 6 |
| Total Number of Incoming Bytes for traffic class 6 | Incremented by the number of data bytes in the incoming PCI operation if the incoming PCI operation targets traffic class 6 |
| Total Number of Incoming PCI Operations for traffic class 7 | Incremented by 1 if the incoming PCI operation targets traffic class 7 |
| Total Number of Incoming Bytes for traffic class 7 | Incremented by the number of data bytes in the incoming PCI operation if the incoming PCI operation targets traffic class 7 |
| Total Number of Incoming PCI Operations for traffic class 8 | Incremented by 1 if the incoming PCI operation targets traffic class 8 |
| Total Number of Incoming Bytes for traffic class 8 | Incremented by the number of data bytes in the incoming PCI operation if the incoming PCI operation targets traffic class 8 |
| Reliability Metrics | |
| Total Amount of Time Elapsed since last permanent error | Incremented by the time elapsed since the last successfully received incoming PCI operation |
| Total Amount of Time Elapsed since last recoverable error | Incremented by the time elapsed since the last incoming PCI operation that had a recoverable error but was successfully received |
| Error Metrics | |
| Total Number of permanent errors | Incremented by 1 |
| Total Number of recoverable errors | Incremented by 1 |

Returning again to step 1808, if the operation is not evaluated as incoming, that is the operation is identified as an outgoing operation, the PCI adapter uses the PCI bus, device, and function numbers to lookup (or as index into) the metrics table associated with the PCI virtual port (step 1850).

The PCI adapter then evaluates whether the PCI virtual port outgoing operation successfully completed (step 1858). If the PCI virtual port operation completes successfully, then the PCI adapter updates the successfully completed outgoing PCI virtual port operation performance and reliability metrics (step 1864), and then proceeds to update other outgoing PCI virtual port operation metrics (step 1868). Returning again to step 1858, if the PCI virtual port operation did not successfully complete, the PCI adapter updates the erroneously completed outgoing PCI virtual port operation reliability metrics (step 1862), and then proceeds to update other outgoing PCI virtual port operation metrics according to step 1868.

Table B depicts examples of performance metrics and how they may be updated in any one or more of steps 1862, 1864, and 1868.

TABLE B

| Metric type and metric | Successful PCI Operation completion results in metric being: |
|---|---|
| Performance Metrics | |
| Total Number of Outgoing PCI Operations | Incremented by 1 |
| Total Number of Outgoing Bytes | Incremented by the number of data bytes in the outgoing PCI operation |
| Total Number of Outgoing PCI Operations for traffic class 1 | Incremented by 1 if the outgoing PCI operation targets traffic class 1 |

TABLE B-continued

| Metric type and metric | Successful PCI Operation completion results in metric being: |
|---|---|
| Total Number of Outgoing Bytes for traffic class 1 | Incremented by the number of data bytes in the outgoing PCI operation if the outgoing PCI operation targets traffic class 1 |
| Total Number of Outgoing PCI Operations for traffic class 2 | Incremented by 1 if the outgoing PCI operation targets traffic class 2 |
| Total Number of Outgoing Bytes for traffic class 2 | Incremented by the number of data bytes in the outgoing PCI operation if the outgoing PCI operation targets traffic class 2 |
| Total Number of Outgoing PCI Operations for traffic class 3 | Incremented by 1 if the outgoing PCI operation targets traffic class 3 |
| Total Number of Outgoing Bytes for traffic class 3 | Incremented by the number of data bytes in the outgoing PCI operation if the outgoing PCI operation targets traffic class 3 |
| Total Number of Outgoing PCI Operations for traffic class 4 | Incremented by 1 if the outgoing PCI operation targets traffic class 4 |
| Total Number of Outgoing Bytes for traffic class 4 | Incremented by the number of data bytes in the outgoing PCI operation if the outgoing PCI operation targets traffic class 4 |
| Total Number of Outgoing PCI Operations for traffic class 5 | Incremented by 1 if the outgoing PCI operation targets traffic class 5 |
| Total Number of Outgoing Bytes for traffic class 5 | Incremented by the number of data bytes in the outgoing PCI operation if the outgoing PCI operation targets traffic class 5 |
| Total Number of Outgoing PCI Operations for traffic class 6 | Incremented by 1 if the outgoing PCI operation targets traffic class 6 |
| Total Number of Outgoing Bytes for traffic class 6 | Incremented by the number of data bytes in the outgoing PCI operation if the outgoing PCI operation targets traffic class 6 |
| Total Number of Outgoing PCI Operations for traffic class 7 | Incremented by 1 if the outgoing PCI operation targets traffic class 7 |
| Total Number of Outgoing Bytes for traffic class 7 | Incremented by the number of data bytes in the outgoing PCI operation if the outgoing PCI operation targets traffic class 7 |
| Total Number of Outgoing PCI Operations for traffic class 8 | Incremented by 1 if the outgoing PCI operation targets traffic class 8 |
| Total Number of Outgoing Bytes for traffic class 8 | Incremented by the number of data bytes in the outgoing PCI operation if the outgoing PCI operation targets traffic class 8 |
| Reliability Metrics | |
| Total Amount of Time Elapsed since last permanent error | Incremented by the time elapsed since the last successfully received outgoing PCI operation |
| Total Amount of Time Elapsed since last recoverable error | Incremented by the time elapsed since the last outgoing PCI operation that had a recoverable error but was successfully received |
| Error Metrics | |
| Total Number of permanent errors | Incremented by 1 |
| Total Number of recoverable errors | Incremented by 1 |

After the adapter updates the other outgoing PCI virtual port operation metrics according to step 1868, the run-time routine exits according to step 1870.

Figure 19:
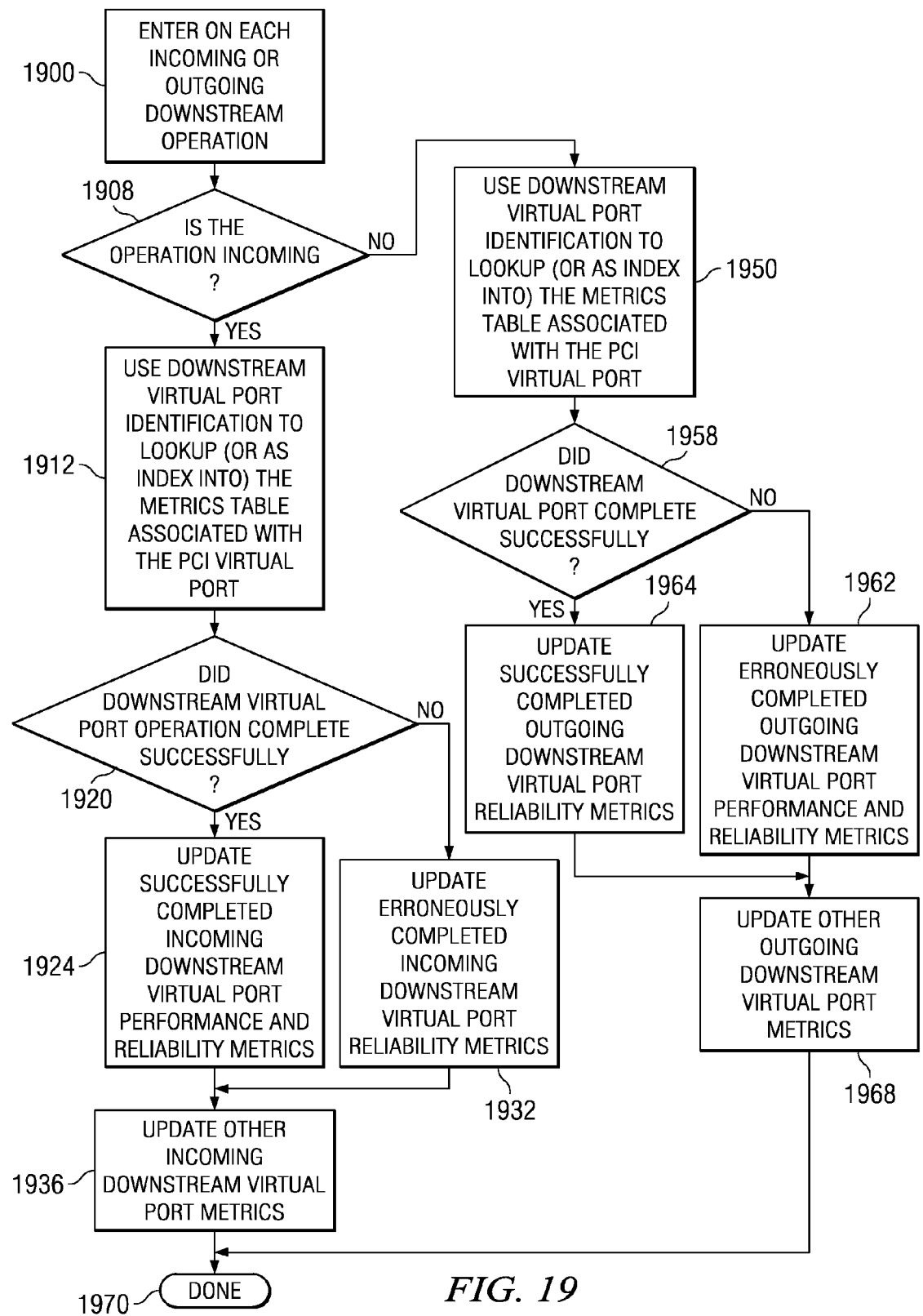
FIG. 19 is a flowchart outlining functions performed at run-time on an adapter used to maintain performance, reliability, and other metrics per downstream virtual port in accordance with a preferred embodiment of the present invention.

FIG. 19 is a flowchart outlining the functions performed at run-time on incoming or outgoing operations that target a downstream virtual port of an adapter that provides metrics per virtual port in accordance with a preferred embodiment of the present invention.

The routine is entered when an incoming or outgoing operation targets a downstream virtual port of an adapter that provides the metrics per virtual port mechanism in accordance with a preferred embodiment of the present invention (step 1900).

The adapter then determines if the operation is incoming or outgoing (step 1908). If the operation is an incoming downstream virtual port operation, then the PCI adapter uses the downstream virtual port's identifier (for example, a Fiber Channel N-Port ID; an Ethernet virtual MAC address; an Ethernet Virtual LAN ID; or a SCSI virtual initiator ID) to lookup (or as index into) the metrics table associated with the downstream virtual port (step 1912).

An evaluation is then made to determine whether the downstream operation completes successfully (step 1920). If the operation successfully completed, then the adapter proceeds to update the successfully completed incoming downstream virtual port operation performance and reliability metrics (step 1924) and subsequently updates other incoming virtual port metrics (step 1936). Returning again to step 1920, if the operation did not complete successfully, the adapter updates the erroneously completed incoming downstream virtual port operation reliability metrics (step 1932) and then proceeds to update other incoming downstream virtual port metrics according to step 1936.

Table C depicts examples of various performance metrics and exemplary mechanism for updating the performance metrics in any one or more of steps 1924, 1932, and 1936.

TABLE C

| Metric type and metric | | Successful downstream Operation completion results in metric being: |
|---|---|---|
| Performance Metrics | | |
| Total Number of Incoming downstream virtual port Operations | | Incremented by 1 |
| Total Number of Incoming Bytes | | Incremented by the number of data bytes in the incoming downstream operation |
| If the downstream virtual port supports | Total Number of Incoming downstream virtual port | Incremented by 1 if the incoming downstream operation targets traffic class N |

TABLE C-continued

| Metric type and metric | | Successful downstream Operation completion results in metric being: |
|---|---|---|
| multiple service levels (e.g. traffic classes), then the metrics to the right would be included in the table for each traffic class. | Operations for traffic class N | |
| | Total Number of Incoming Bytes for traffic class N | Incremented by the number of data bytes in the incoming downstream operation if the incoming downstream operation targets traffic class N |
| Reliability Metrics | | |
| Total Amount of Time Elapsed since last permanent error | | Incremented by the time elapsed since the last successfully received incoming downstream operation |
| Total Amount of Time Elapsed since last recoverable error | | Incremented by the time elapsed since the last incoming downstream operation that had a recoverable error but was successfully received |
| Error Metrics | | |
| Total Number of permanent errors | | Incremented by 1 |
| Total Number of recoverable errors | | Incremented by 1 |

After updating downstream virtual port metrics according to step 1936, the routine completes the process (step 1970).

Returning again to step 1908, if the operation is identified as an incoming operation, the PCI adapter uses the downstream virtual port's identifier (for example, a Fiber Channel N-Port ID; an Ethernet virtual MAC address; an Ethernet Virtual LAN ID; or a SCSI virtual initiator ID) to lookup (or as index into) the metrics table associated with the downstream virtual port (step 1950).

An evaluation is then made to determine whether the downstream operation completes successfully (step 1958). If the downstream operation completed successfully, the adapter then updates the successfully completed outgoing downstream virtual port operation performance and reliability metrics (step 1964), and subsequently updates other outgoing downstream virtual port metrics (step 1968). Returning again to step 1958, if the downstream virtual port operation did not successfully complete, the adapter then updates the erroneously completed outgoing downstream virtual port operation reliability metrics (step 1962), and then updates other outgoing downstream virtual port metrics according to step 1968.

Table D depicts examples of various performance metrics and exemplary mechanisms for updating the metrics.

TABLE D

| Type of metric and metric | | Successful downstream Operation completion results in metric being |
|---|---|---|
| Performance Metrics | | |
| Total Number of Outgoing downstream virtual port Operations | | Incremented by 1 |
| Total Number of Outgoing Bytes | | Incremented by the number of data bytes in the outgoing downstream operation |
| If the downstream virtual port supports multiple service levels (e.g. traffic classes), then the metrics to the right would be included in the table for each traffic class. | Total Number of Outgoing downstream virtual port Operations for traffic class N | Incremented by 1 if the outgoing downstream operation targets traffic class N |
| | Total Number of Outgoing Bytes for traffic class N | Incremented by the number of data bytes in the outgoing downstream operation if the outgoing downstream operation targets traffic class N |
| Reliability Metrics | | |
| Total Amount of Time Elapsed since last permanent error | | Incremented by the time elapsed since the last successfully received outgoing downstream operation |
| Total Amount of Time Elapsed since last recoverable error | | Incremented by the time elapsed since the last outgoing downstream operation that had a recoverable error but was successfully received |
| Error Metrics | | |
| Total Number of permanent errors | | Incremented by 1 |
| Total Number of recoverable errors | | Incremented by 1 |

After the adapter updates the downstream virtual port metrics according to step 1968, the routine completes the process according to step 1970.

As described, a mechanism of managing per-virtual port performance metrics in a logically partitioned data processing system is provided by the teachings of the invention. A subset of resources of a physical adapter is allocated to a virtual adapter of a plurality of virtual adapters. The subset of resources includes a virtual port having an identifier assigned thereto. The identifier of the virtual port is associated with an address of the physical adapter port. A metric table is associated with the virtual port, wherein the metric table includes metrics of operations that target the virtual port. Thus, performance metrics are managed on a per-virtual port basis.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product stored in a computer readable medium for managing per-virtual port performance metrics in a logically partitioned data processing system, the computer program product comprising:

instructions for receiving a request to perform a management operation for a particular virtual port;

instructions for determining by a physical adapter whether the management operation is a read of metrics for the particular virtual port;

instructions for determining by the physical adapter whether the management operation is an initialize operation of the metrics for the particular virtual port in response to determining that the management operation is not a read;

instructions for determining whether the particular virtual port is an upstream port or a downstream port in response to determining that the management operation is an initialize operation:

instructions for allocating by the physical adapter an upstream virtual port table for the particular virtual port in response to determining that the particular virtual port is an upstream port;

instructions for allocating by the physical adapter a downstream virtual port table for the particular virtual port in response to determining that the particular virtual port is a downstream port;

instructions for assigning the allocated virtual port table to the particular virtual port;

instructions for resetting the metrics for the particular virtual port to zero in the virtual port table that was allocated for the particular virtual port; and instructions for transferring completion results to a host through a direct memory access operation;

instructions for determining whether the management operation is a destroy operation in response to determining that the management operation is not an initialize operation;

instructions for destroying the virtual port table for the particular virtual port in response to determining that the management operation is a destroy operation; and instructions for resetting the metrics for the particular virtual port to zero in the virtual port table that was allocated for the particular virtual port in response to determining that the management operation is not a destroy operation.

2. The computer program product of claim 1, further comprising:

instructions for allocating a subset of resources of the physical adapter to a virtual adapter within a plurality of virtual adapters, wherein the subset includes a virtual port having an identifier assigned thereto;

instructions for associating the identifier of the virtual port with an address of a physical port; and instructions for associating a metric table with the virtual port, wherein the metric table includes metrics of operations that target the virtual port.

3. The computer program product of claim 2, wherein the instructions for associating the identifier further comprises:

instructions for associating a bus number, a device number, and a function number assigned to the virtual port with the address of the physical port.

4. The computer program product of claim 1, further comprising:

instructions for reading by the physical adapter the virtual port table for the particular virtual port in response to determining that the management operation is a read; and instructions for transferring the metrics for the particular virtual port and management operation completion results through a direct memory access operation to the host.

5. The computer program product of claim 2, wherein the metric table includes reliability metrics of successfully completed virtual port operation metrics and erroneously completed virtual port operation metrics.

6. The computer program product of claim 5, comprising:

instructions for receiving a peripheral component interconnect port operation;

instructions for reading the identifier from the peripheral component interconnect port operation;

instruction for indexing the metric table using the identifier; and instructions for determining whether the peripheral component interconnect port operation successfully completed.

7. The computer program product of claim 6, further comprising:

instructions for updating one of the reliability metrics of successfully completed virtual port operation metrics and the erroneously completed virtual port operation metrics in response to determining that the peripheral component interconnect port operation successfully completed.

8. A logically partitioned data processing system that manages per-virtual port performance metrics, comprising:

a storage device, where the storage device includes a set of instructions; and a processor, wherein the processor executes the set of instructions to:

receive a request to perform a management operation for a particular virtual port;

determine by a physical adapter whether the management operation is a read of metrics for the particular virtual port;

determine by the physical adapter whether the management operation is an initialize operation of the metrics for the particular virtual port in response to determining that the management operation is not a read;

determine whether the particular virtual port is an upstream port or a downstream port in response to determining that the management operation is an initialize operation:

allocate by the physical adapter an upstream virtual port table for the particular virtual port in response to determining that the particular virtual port is an upstream port;

allocate by the physical adapter a downstream virtual port table for the particular virtual port in response to determining that the particular virtual port is a downstream port;

assign the allocated virtual port table to the particular virtual port;

reset the metrics for the particular virtual port to zero in the virtual port table that was allocated for the particular virtual port; and transfer completion results to a host through a direct memory access operation;

determine whether the management operation is a destroy operation in response to determining that the management operation is not an initialize operation;

destroy the virtual port table for the particular virtual port in response to determining that the management operation is a destroy operation; and reset the metrics for the particular virtual port to zero in the virtual port table that was allocated for the particular virtual port in response to determining that the management operation is not a destroy operation.

9. The data processing system of claim 8, wherein the processor executes a further set of instructions to:

allocate a subset of resources of the physical adapter to a virtual adapter within a plurality of virtual adapters, wherein the subset includes a virtual port having an identifier assigned thereto;

associate the identifier of the virtual port with an address of a physical port; and associate a metric table with the virtual port, wherein the metric table includes metrics of operations that target the virtual port.

10. The data processing system of claim 9, wherein associating the identifier further comprises:

the processor executing a further set of instructions to associate a bus number, a device number, and a function number assigned to the virtual port with the address of the physical port.

11. The data processing system of claim 8, wherein the processor executes a further set of instructions to:

read by the physical adapter the virtual port table for the particular virtual port in response to determining that the management operation is a read; and transfer the metrics for the particular virtual port and management operation completion results through a direct memory access operation to the host.

12. The data processing system of claim 9, wherein the metric table includes reliability metrics of successfully completed virtual port operation metrics and erroneously completed virtual port operation metrics, and wherein the processor executes a further set of instructions to:

receive a peripheral component interconnect port operation;

read the identifier from the peripheral component interconnect port operation;

index the metric table using the identifier; and determine whether the peripheral component interconnect port operation successfully completed.

13. The data processing system of claim 12, wherein the processor executes a further set of instructions to:

update one of the reliability metrics of successfully completed virtual port operation metrics and the erroneously completed virtual port operation metrics in response to determining that the peripheral component interconnect port operation successfully completed.

* * * * *